United States Patent
Li et al.

(10) Patent No.: US 8,932,466 B2
(45) Date of Patent: Jan. 13, 2015

(54) METHOD AND APPARATUS FOR SLUGE TREATMENT AND USE THEREOF IN SEWAGE BIOTREATMENT

(76) Inventors: Jinmin Li, Linyi (CN); Liankui Zhou, Linyi (CN); Dayong Li, Linyi (CN)

( * ) Notice: Subject to any disclaimer, the term of this patent is extended or adjusted under 35 U.S.C. 154(b) by 455 days.

(21) Appl. No.: 13/509,599

(22) PCT Filed: May 28, 2010

(86) PCT No.: PCT/CN2010/073333
§ 371 (c)(1),
(2), (4) Date: May 11, 2012

(87) PCT Pub. No.: WO2011/066736
PCT Pub. Date: Jun. 9, 2011

(65) Prior Publication Data
US 2012/0228217 A1    Sep. 13, 2012

(30) Foreign Application Priority Data

Dec. 1, 2009   (CN) .......................... 2009 1 0249722
Jan. 15, 2010  (CN) .......................... 2010 1 0000737

(51) Int. Cl.
*C02F 3/30*    (2006.01)
*C02F 11/02*   (2006.01)

(52) U.S. Cl.
CPC . *C02F 3/30* (2013.01); *C02F 11/02* (2013.01); *Y10S 210/906* (2013.01)
USPC ........... 210/603; 210/605; 210/615; 210/622; 210/623; 210/630; 210/259; 210/906

(58) Field of Classification Search
CPC .................................. C02F 3/30; C02F 11/02
USPC ......... 210/603, 605, 615, 621, 622, 623, 630, 210/188, 252, 259, 906
See application file for complete search history.

(56) References Cited

U.S. PATENT DOCUMENTS

| | | | |
|---|---|---|---|
| 4,130,481 A * | 12/1978 | Chase et al. ................... | 210/603 |
| 4,370,235 A | 1/1983 | Suzuki et al. | |
| 4,956,094 A * | 9/1990 | Levin et al. .................... | 210/625 |

(Continued)

FOREIGN PATENT DOCUMENTS

| | | |
|---|---|---|
| CN | 1101628 A | 4/1995 |
| CN | 1935708 A | 5/2007 |

(Continued)

*Primary Examiner* — Fred Prince
(74) *Attorney, Agent, or Firm* — Novick, Kim & Lee, PLLC; Allen Xue

(57) ABSTRACT

The present invention provides a method for sludge treatment, comprising the following steps: (1) mixing a sludge feed from a sewage biotreatment process with a first mixed liquor to obtain a second mixed liquor; (2) subjecting the second mixed liquor to an oxygen-supplying process to obtain a third mixed liquor; (3) subjecting the third mixed liquor to an anoxic process to obtain a fourth mixed liquor; (4) separating the fourth mixed liquor to obtain a supernatant liquid and a first concentrated mixed liquor; (5) discharging the supernatant liquid, and returning at least a part of the first concentrated mixed liquor as the first mixed liquor to the step (1), wherein the amount of sludge of the first concentrated mixed liquor that does not return to the step (1) is less than the amount of sludge of the sludge feed. The present invention further relates to the use of the method for sludge treatment in sewage treatment. The method for sludge treatment can achieve a long term stable run without sludge discharge.

21 Claims, 5 Drawing Sheets

(56) References Cited

U.S. PATENT DOCUMENTS

| | | | | |
|---|---|---|---|---|
| 4,999,111 | A | * | 3/1991 | Williamson ................ 210/605 |
| 5,989,428 | A | * | 11/1999 | Goronszy ................... 210/605 |
| 6,015,496 | A | * | 1/2000 | Khudenko .................. 210/603 |
| 2001/0000008 | A1 | | 3/2001 | Hasegawa et al. |
| 2002/0074287 | A1 | | 6/2002 | Park et al. |

FOREIGN PATENT DOCUMENTS

| | | | |
|---|---|---|---|
| CN | 101428939 A | | 5/2009 |
| EP | 1002768 A1 | | 5/2000 |
| JP | 60-222198 A | * | 11/1985 |
| JP | H0330900 A | | 2/1991 |
| JP | 3-207489 A | * | 9/1991 |
| JP | 2001286897 A | | 10/2001 |
| JP | 2003275719 A | | 9/2003 |
| JP | 2004041953 A | | 2/2004 |
| JP | 2005161110 A | | 6/2005 |
| JP | 2007029801 A | | 2/2007 |
| JP | 2008023498 A | | 2/2008 |
| JP | 2008036514 A | | 2/2008 |
| JP | 2008114161 A | | 5/2008 |
| TW | 200516056 A1 | | 5/2005 |
| TW | 200736176 A1 | | 10/2007 |
| TW | I304796 B | | 1/2009 |
| TW | I316923 B | | 11/2009 |

* cited by examiner

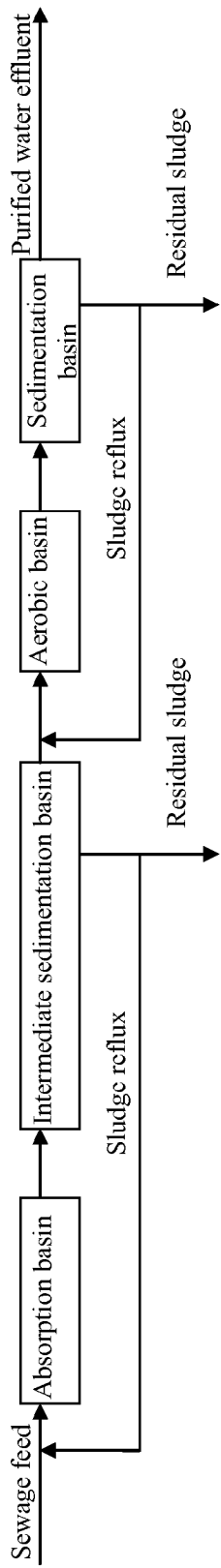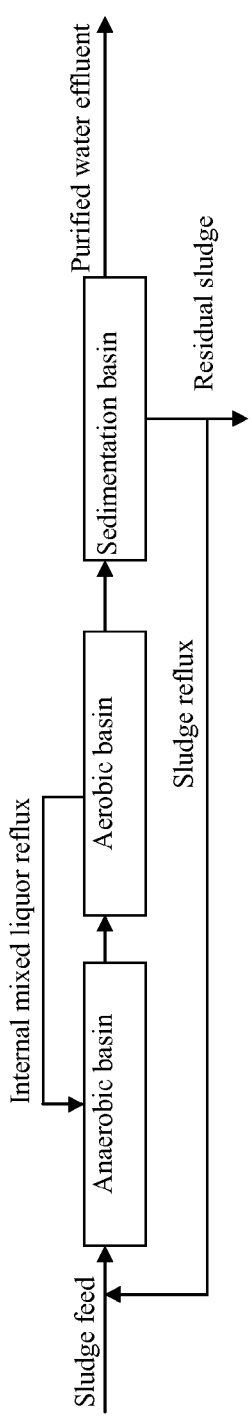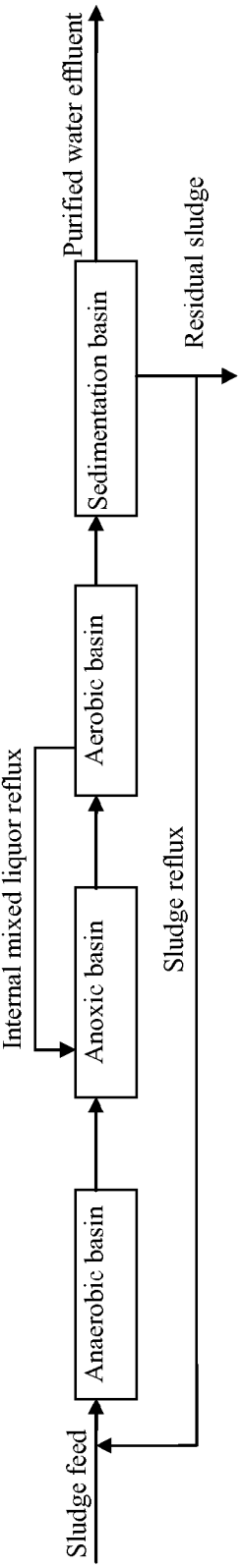

METHOD AND APPARATUS FOR SLUGE TREATMENT AND USE THEREOF IN SEWAGE BIOTREATMENT

The present application claims the priorities of the following patent applications: (1) Chinese patent application 200910249722.X, filed on Dec. 1, 2009; and (2) Chinese patent application 201010000737.5, filed on Jan. 15, 2010. The contents of these patent applications are incorporated into the present application by reference.

TECHNICAL FIELD

The present invention relates to a method and an apparatus for sludge treatment and their use in sewage biotreatment, in particular to a method and an apparatus for sludge reduction treatment as well as a method and an apparatus for sewage biotreatment by employing the method for sludge reduction treatment.

BACKGROUND ART

Water pollution is gradually serious, so it is necessary to treat various sewages economically and effectively. Currently, thousands sewage treatment plants are running in the world, and more sewage treatment plants will be built with the development of environmental senses and requirements.

Sewage biotreatment is widely applied to sewage treatment due to its outstanding advantages of high performance and low energy consumption, and sewage biotreatment technologies represented with activated sludge technologies and biomembrane technologies are successfully used in sewage treatment and pollution abatement. However, the sewage biotreatment technologies in the prior art still have some drawbacks.

In practical processes, many sewage plants have to face the following challenges: (1) insufficient amount of sewage feed, mainly resulted from advanced design and failures in sanitary sewer system, which may influence the operation of sewage treatment apparatus; (2) unstable quality of sewage feed, mainly resulted from draining industrial wastewater into sanitary sewer system and living habit changes caused by holidays and seasonal variation, which may form shock load to influence sewage treatment effects; (3) carbon-source deficiency, as a common problem of sewage treatment plants, mainly attributed to modern living habits, which may result in unbalance of nutrients in organisms and influence the removal effects of nitrogen and phosphorus. Facing these challenges, conventional activated sludge methods usually have the following drawbacks: (1) low biomass concentration in aeration basin; (2) poor ability in resisting shock load of quality and amount of sewage feed; (3) easy sludge bulking; (4) high yield of sludge; (5) high cost in construction and operation, and large floor space, etc.

In particular, conventional sewage biotreatment technologies usually have an arresting problem of producing a large amount of sludge. The cost for treating sludge usually is dramatically high, and is about 50-60% of the total cost for construction and operation of a sewage treatment plant. Residual sludge needs to be treated and therefore increases the operation cost and limits the choice of activated sludge treatment methods. In general, sludge reduction methods include digestive methods (including anaerobic digestive methods and aerobic digestive methods), sludge heat-treatment method such as wet oxidation methods, sludge concentration methods such as gravity thickening methods and air-floating methods, sludge dewatering methods such as mechanical dewatering methods and chemical aggregating methods, sludge anhydrating methods such as natural anhydrating methods and oven drying methods. However, these methods are still not enough to address the problems of sludge discharge.

Chinese patent application CN10148119A discloses a sewage treatment method with a backflow of sludge for digestion and reduction, in which a residual sludge returns back an anaerobic sedimentation basin and accumulates at the bottom of the anaerobic sedimentation basin for a long period of time so as to digest and reduce the sludge, while a sewage feed passes through the anaerobic sedimentation basin and then is subjected to a sewage treatment to obtain a purified water and the residual sludge, in which the undigested sludge must be removed periodically.

U.S. patent application US2002/0030003A1 discloses an activated sludge system and method, in which wastewater is treated with sludge in a contact tank, then sludge and water are separated in a solid/liquid separator, the separated sludge and a part of wastewater are mixed and aerated in a digester basin to digest and reduce sludge, the aerated mixture of sludge and water is partially returns to the contact basin and partially discharged.

In addition, conventional biotreatment of sewage usually is not good at the removal of phosphorus. Phosphorus is the main restriction factor causing eutrophication of water body, and is an important element for sustainable development of human being. Hence, the control of phosphorus content in water body is gradually stringent, and is changing from single "removal" to "recovery". Currently, dephosphorization technologies are mainly based on phosphorus-accumulating bacteria which can uptake and accumulate a large amount of phosphorus under aerobic condition after releasing phosphorus under anaerobic condition. Hence, a certain amount of sludge is still discharged to finally remove phosphorus, which also challenges the reduction of sludge.

In sum, novel sludge treatment methods and sewage treatment methods are still in need to be development so as to address the above problems, especially the problems about sludge reduction.

CONTENT OF THE INVENTION

In one aspect, the present invention provides a method for sludge treatment, comprising the following steps:
(1) Mixing a sludge feed from a sewage biotreatment process with a first mixed liquor to obtain a second mixed liquor;
(2) Subjecting the second mixed liquor to an oxygen-supplying process to obtain a third mixed liquor;
(3) Subjecting the third mixed liquor to an anoxic process to obtain a fourth mixed liquor;
(4) Separating the fourth mixed liquor to obtain a supernatant liquid and a first concentrated mixed liquor; and
(5) Discharging the supernatant liquid, and returning at least a part of the first concentrated mixed liquor as the first mixed liquor to the step (1), wherein the amount of sludge of the first concentrated mixed liquor that does not return to the step (1) is less than the amount of sludge of the sludge feed.

According to some embodiments of the method for sludge treatment of the present invention, in the step (5), a suitable proportion, such as at least 60%, preferably at least 65%, more preferably at least 70%, more preferably at least 75%, more preferably at least 80, more preferably at least 85%, more preferably at least 90%, more preferably at least 93%, more preferably at least 95%, more preferably at least 98%, most preferably essentially 100% of the first concentrated mixed liquor returns to the step (1) and is used as the first mixed liquor, and optionally the first concentrated mixed liquor that does not return to the step (1) is discharged. In other words, in the step (5), the amount of sludge of the first concentrated mixed liquor that does not return to the step (1) can be of any proportion of the amount of sludge of the sludge feed, for example, the proportion can be less than about 40%, less than about 35%, less than about 30%, less than about 25%, less than about 20%, less than about 15%, less than about 13%, less than about 10%, less than about 8%, less than about 5%, less than about 3%, less than about 1% or about 0%. According to some embodiments of the method for sludge treatment of the present invention, in the step (5), essentially all of the first concentrated mixed liquor returns to the step (1) and is used as the first mixed liquor.

According to some embodiments of the method for sludge treatment of the present invention, in the step (1), an organic nutrient (preferably a sewage feed) is mixed with the sludge feed and the first mixed liquor to obtain the second mixed liquor. In other words, the step (1) further comprises introducing a sewage feed into the first mixed liquor.

According to some embodiments of the method for sludge treatment of the present invention, in the step (1), the flow ratio of the sludge feed to the sewage feed is 1:0.01 to 1:100, preferably 1:0.1 to 1:10, more preferably 1:0.5 to 1:5. Specifically, the flow ratio of the sludge feed to the sewage feed can be any suitable value, such as 1:100 to 1:50, 1:50 to 1:20, 1:20 to 1:10, 1:10 to 1:5, 1:5 to 1:2, 1:2 to 1:1.5, 1:1.5 to 1:1, 1:1 to 1:0.8, 1:0.8 to 1:0.5, 1:0.5 to 1:0.2, 1:0.2 to 1:0.1, 1:0.1 to 1:0.05, 1:0.05 to 1:0.02 and 1:0.02 to 1:0.01.

According to some embodiments of the method for sludge treatment of the present invention, in the step (2), the oxygen-supplying process has an oxygen-supplying treatment time of 0.1 to 4 hours, preferably 0.5 to 2 hours, more preferably 0.5 to 1.5 hours.

According to some embodiments of the method for sludge treatment of the present invention, in the step (3), the anoxic process has an anoxic treatment time of 0.8 to 6 hours, preferably 1 to 4 hours, more preferably 1 to 3 hours.

According to some embodiments of the method for sludge treatment of the present invention, the ratio of the oxygen-supplying treatment time to the anoxic treatment time is 1:0.5 to 1:6, preferably 1:1 to 1:3, more preferably 1:1.5 to 1:2, most preferably 1:2.

According to some embodiments of the method for sludge treatment of the present invention, in the step (2), the oxygen-supplying process is performed in a manner of intermittent aeration or continuous aeration.

According to some embodiments of the method for sludge treatment of the present invention, in the step (2), the third mixed liquor has a dissolved oxygen content of 0.1 to 4 mg/L, preferably 1.5 to 3 mg/L, more preferably 2 to 3 mg/L.

According to some embodiments of the method for sludge treatment of the present invention, the step (3) and the step (4) are performed in a manner of sedimentation.

According to some embodiments of the method for sludge treatment of the present invention, in the step (1), the second mixed liquor has a sludge concentration of 3,000 to 30,000 mg/L, preferably 3,000 to 20,000 mg/L, more preferably 4,000 to 15,000 mg/L.

According to some embodiments of the method for sludge treatment of the present invention, the first, second, third and fourth mixed liquors contain facultative organisms as dominant flora.

According to some embodiments of the method for sludge treatment of the present invention, the method further comprises a step for recovering gaseous phosphorus-containing compounds generated in the step (2) and/or (3).

In other aspect, the present invention further provides a method for sewage biotreatment, comprising:

(1) Mixing a sludge feed from a sewage biotreatment process with a first mixed liquor to obtain a second mixed liquor;

(2) Subjecting the second mixed liquor to an oxygen-supplying process to obtain a third mixed liquor;

(3) Subjecting the third mixed liquor to an anoxic process to obtain a fourth mixed liquor;

(4) Separating the fourth mixed liquor to obtain a supernatant liquid and a first concentrated mixed liquor;

(5) Discharging the supernatant liquid, and returning at least a part of the first concentrated mixed liquor as the first mixed liquor to the step (1), wherein the amount of sludge of the first concentrated mixed liquor that does not return to the step (1) is less than the amount of sludge of the sludge feed;

(6) Subjecting at least a part of the supernatant liquid from the step (5) and optionally a part of sewage feed to the sewage biotreatment process to obtain a second concentrated mixed liquor and a purified water effluent; and (7) Discharging the purified water effluent, and optionally returning at least a part of the second concentrated mixed liquor from the step (6) as the sludge feed to the step (1);

wherein a sewage feed is introduced to the step (1) and mixed with the sludge feed and the first mixed liquor to obtain the second mixed liquor and/or introduced to the step (6) and subjected to the sewage biotreatment process together with the at least part of supernatant from the step (5), preferably, at least part of the sewage feed is introduced to the step (1) and mixed with the sludge feed and the first mixed liquor to obtain the second mixed liquor, and more preferably, all of the sewage feed is introduced to the step (1) and mixed with the sludge feed and the first mixed liquor to obtain the second mixed liquor.

According to some embodiments of the method for sewage biotreatment of the present invention, in the step (5), at least 60%, preferably at least 65%, more preferably at least 70%, more preferably at least 75%, more preferably at least 80%, more preferably at least 85%, more preferably at least 90%, more preferably at least 93%, more preferably at least 95%, more preferably at least 98%, most preferably essentially 100% of the first concentrated mixed liquor returns to the step (1) and is used as the first mixed liquor, and optionally the first concentrated mixed liquor that does not return to the step (1) is discharged.

According to some embodiments of the method for sewage biotreatment of the present invention, in the step (6), at least 20%, preferably at least 35%, more preferably at least 50%, more preferably at least 65%, more preferably at least 80%, more preferably at least 85%, more preferably at least 90%, more preferably at least 93%, more preferably at least 95%, more preferably at least 98%, most preferably essentially 100% of the supernatant from the step (5) is subjected to the sewage biotreatment.

According to some embodiments of the method for sewage biotreatment of the present invention, at least 20%, preferably at least 35%, more preferably at least 50%, more preferably at least 65%, more preferably at least 80%, more preferably at least 85%, more preferably at least 90%, more preferably at least 93%, more preferably at least 95%, more preferably at least 98%, most preferably essentially 100% of the sewage feed is introduced to the step (1), and the residual of the sewage feed is introduced to the step (6). In some preferable embodiments, all sewage feed is introduced to the step (1), and no sewage feed is introduced to the step (6).

According to some embodiments of the method for sewage biotreatment of the present invention, in the step (2), the oxygen-supplying process has an oxygen-supplying treatment time of 0.1 to 4 hours, preferably 0.5 to 2 hours, more preferably 0.5 to 1.5 hours.

According to some embodiments of the method for sewage biotreatment of the present invention, in the step (3), the anoxic process has an anoxic treatment time of 0.8 to 6 hours, preferably 1 to 4 hours, more preferably 1 to 3 hours.

According to some embodiments of the method for sewage biotreatment of the present invention, the ratio of the oxygen-supplying treatment time to the anoxic treatment time is 1:0.5 to 1:6, preferably 1:1 to 1:3, more preferably 1:1.5 to 1:2, most preferably 1:2.

According to some embodiments of the method for sewage biotreatment of the present invention, in the step (2), the oxygen-supplying process is performed in a manner of intermittent aeration or continuous aeration.

According to some embodiments of the method for sewage biotreatment of the present invention, in the step (2), the third mixed liquor has a dissolved oxygen content of 0.1 to 4 mg/L, preferably 1.5 to 3 mg/L, more preferably 2 to 3 mg/L.

According to some embodiments of the method for sewage biotreatment of the present invention, the step (3) and the step (4) are performed in a manner of sedimentation (preferably in a sedimentation basin).

According to some embodiments of the method for sewage biotreatment of the present invention, in the step (1), the second mixed liquor has a sludge concentration of 3,000 to 30,000 mg/L, preferably 3,000 to 20,000 mg/L, more preferably 4,000 to 15,000 mg/L.

According to some embodiments of the method for sewage biotreatment of the present invention, the method further comprises a step for recovering gaseous phosphorus-containing compounds generated in the step (2) and/or the step (3).

According to some embodiments of the method for sewage biotreatment of the present invention, the second concentrated mixed liquor that returns from the step (7) to the step (1) and is used as the sludge feed is 1 to 100%, preferably about 80 to 100%, more preferably about 100%, relative to the second concentrated mixed liquor.

According to some embodiments of the method for sewage biotreatment of the present invention, in the step (6), the sewage biotreatment process is Wuhrmann process, A/O process, Bardenpho process, Phoredox process, $A^2/O$ process, reversed $A^2/O$ process, UCT process, MUCT process, VIP process, OWASA process, JHB process, TNCU process, Dephanox process, BCFS process, MSBR process, SBR process, AB process, oxidation ditch process, biomembrane process, moving bed process or a combination thereof.

In another aspect, the present invention further provides an apparatus for sludge treatment useful in the above method for sludge treatment, comprising: a first device disposed for mixing a sewage feed, a sludge feed and a first mixed liquor to obtain a second mixed liquor; a second device disposed for subjecting the second mixed liquor to an oxygen-supplying process to obtain a third mixed liquor; a third device disposed for subjecting the third mixed liquor to an anoxic process to obtain a fourth mixed liquor; a fourth device disposed for separating the fourth mixed liquor to obtain a supernatant and a first concentrated mixed liquor; a fifth device disposed for discharging the supernatant liquid; and a sixth device disposed for returning at least part of the first concentrated mixed liquor as the first mixed liquor to the first device so that the amount of sludge of the first concentrated mixed liquor that does not return to the first device is less than the amount of sludge of the sludge feed.

According to some embodiments of the apparatus for sludge treatment of the present invention, the second device is disposed to have an oxygen-supplying treatment time of 0.1 to 4 hours, preferably 0.5 to 2 hours, more preferably 0.5 to 1.5 hours.

According to some embodiments of the apparatus for sludge treatment of the present invention, the third device is disposed to have an anoxic treatment time of 0.8 to 6 hours, preferably 1 to 4 hours, more preferably 1 to 3 hours.

According to some embodiments of the apparatus for sludge treatment of the present invention, the second device and third device are disposed so that the ratio of the oxygen-supplying treatment time to the anoxic treatment time is 1:0.5 to 1:6, preferably 1:1 to 1:3, more preferably 1:1.5 to 1:2, most preferably 1:2.

According to some embodiments of the apparatus for sludge treatment of the present invention, the second device is an aeration basin.

According to some embodiments of the apparatus for sludge treatment of the present invention, the third device and the fourth device are a sedimentation basin, that is, the sedimentation basin is used as the third device and the fourth device simultaneously.

According to some embodiments of the apparatus for sludge treatment of the present invention, the apparatus for sludge treatment further comprises a recovery device for collecting and recovering gaseous phosphorus-containing compounds.

In another aspect, the present invention further provides an apparatus for sewage biotreatment useful in the above method for sewage biotreatment, comprising: a first device disposed for mixing a sludge feed with a first mixed liquor to obtain a second mixed liquor; a second device disposed for subjecting the second mixed liquor to an oxygen-supplying process to obtain a third mixed liquor; a third device disposed for subjecting the third mixed liquor to an anoxic process to obtain a fourth mixed liquor; a fourth device disposed for separating the fourth mixed liquor to obtain a supernatant and a first concentrated mixed liquor; a fifth device disposed for discharging the supernatant liquid; a sixth device disposed for returning at least part of the first concentrated mixed liquor as the first mixed liquor to the first device so that the amount of sludge of the first concentrated mixed liquor that does not return to the first device is less than the amount of sludge of the sludge feed; a seventh device disposed for subjecting at least part of the supernatant from the fifth device to a sewage biotreatment process to obtain a second concentrated mixed liquor and a purified water effluent; an eighth device disposed for discharging the purified water effluent; a ninth device disposed for introducing a sewage feed into the first device so as to mix with the sludge feed and the first mixed liquor to obtain the second mixed liquor and/or into the seventh device so as to subject to the sewage biotreatment process together with the supernatant; and optionally a tenth device disposed for returning at least part of the second concentrated mixed liquor to the first device.

According to some embodiments of the apparatus for sewage biotreatment of the present invention, the second device is disposed to have an oxygen-supplying treatment time of 0.1 to 4 hours, preferably 0.5 to 2 hours, more preferably 0.5 to 1.5 hours.

According to some embodiments of the apparatus for sewage biotreatment of the present invention, the third device is disposed to have an anoxic treatment time of 0.8 to 6 hours, preferably 1 to 4 hours, more preferably 1 to 3 hours.

According to some embodiments of the apparatus for sewage biotreatment of the present invention, the second device and third device are disposed so that the ratio of the oxygen-supplying treatment time to the anoxic treatment time is 1:0.5 to 1:6, preferably 1:1 to 1:3, more preferably 1:1.5 to 1:2, most preferably 1:2.

According to some embodiments of the apparatus for sewage biotreatment of the present invention, the second device is an aeration basin.

According to some embodiments of the apparatus for sewage biotreatment of the present invention, the third device and the fourth device are a sedimentation basin, that is, the sedimentation basin is used as the third device and the fourth device simultaneously.

According to some embodiments of the apparatus for sewage biotreatment of the present invention, the apparatus for sludge treatment further comprises a recovery device for collecting and recovering gaseous phosphorus-containing compounds.

According to some embodiments of the apparatus for sewage biotreatment of the present invention, the seventh device is a device that performs sewage biotreatment by Wuhrmann process, A/O process, Bardenpho process, Phoredox process, $A^2$/O process, reversed $A^2$/O process, UCT process, MUCT process, VIP process, OWASA process, JHB process, TNCU process, Dephanox process, BCFS process, MSBR process, SBR process, AB process, oxidation ditch process, biomembrane process, moving bed process or a combination thereof.

In another aspect, the present invention further provides a method for reducing carbon content, nitrogen content and phosphorus content in a sludge from a sewage biotreatment, comprising using the sludge as a sludge feed and subjecting to the above method for sludge treatment to reduce the carbon content, nitrogen content and phosphorus content in the sludge.

In another aspect, the present invention further provides a method for reducing carbon content, nitrogen content and phosphorus content in a sewage, comprising using the sewage as a sewage feed and subjecting to the above method for sewage biotreatment to reduce the carbon content, nitrogen content and phosphorus content in the sludge.

In another aspect, the present invention further provides a method for recovering phosphorus from a sludge generated in a sewage treatment process, comprising: (1) using the sludge as a sludge feed and subjecting to the above method for sludge treatment so as to convert phosphorus-containing compounds (especially phosphorus-containing compounds in form of solution) of the sludge into gaseous phosphorus-containing compounds and allow the gaseous phosphorus-containing compounds escape, and (ii) recovering the gaseous phosphorus-containing compounds that escape in the step (i).

In another aspect, the present invention further provides a method for recovering phosphorus from a sewage, comprising: (1) using the sewage as a sewage feed and subjecting to the above method for sewage biotreatment so as to convert phosphorus-containing compounds (especially phosphorus-containing compounds in form of solution) of the sewage into gaseous phosphorus-containing compounds and allow the gaseous phosphorus-containing compounds escape, and (ii) recovering the gaseous phosphorus-containing compounds that escape in the step (i).

In another aspect, the present invention further provides a method for sludge reduction treatment, comprising the following steps:

(a) Introducing a first sludge from a sewage biotreatment process and an optional sewage feed into an aerobic treatment zone, preferably an aeration basin;

(b) Subjecting the mixture solution in the aerobic treatment zone to aerobic treatment;

(c) Introducing the mixture solution from the aerobic treatment zone to an anoxic treatment zone, preferably a sedimentation basin, for anoxic treatment to obtain a second sludge and a supernatant; and (d) Circulating at least part of the second sludge back to the aerobic treatment zone, and optionally discharging the residual part of the second sludge;

wherein the discharged residual part of the second sludge has a total MLSS less than the total MLSS of the first sludge; and the aerobic treatment can be carried out in a manner of intermittent aeration or continuous aeration. MLSS is a abbreviation of "mixed liquor suspended solids", referring to the total weight (mg/L) of active sludge solids in unit volume of mixed liquor in aeration basin.

According to some embodiments of the method for sludge reduction treatment of the present invention, in the step (d), at least 60%, preferably at least 65%, more preferably at least 70%, more preferably at least 75%, more preferably at least 80%, more preferably at least 85%, more preferably at least 90%, more preferably at least 93%, more preferably at least 95%, more preferably at least 98%, most preferably essentially 100% of the second sludge is circulated back to the aerobic treatment zone.

According to some embodiments of the method for sludge reduction treatment of the present invention, in the step (b), the aerobic treatment time is 0.1-4 h, preferably 0.5-2 h, more preferably 0.5-1.5 h.

According to some embodiments of the method for sludge reduction treatment of the present invention, the mixture solution in the aerobic treatment zone has an outlet dissolved oxygen content of 0.1 to 4 mg/L, preferably 1.5 to 3 mg/L, more preferably 2 to 3 mg/L after the aerobic treatment.

According to some embodiments of the method for sludge reduction treatment of the present invention, the aerobic treatment zone has a sluge concentration of 3,000 to 30,000 mg/L, preferably 3,000 to 20,000 mg/L, more preferably 4,000 to 15,000 mg/L.

According to some embodiments of the method for sludge reduction treatment of the present invention, the method further comprises a step for recovering gaseous phosphorus-containing compounds generated in the step (b) and/or (c).

In another aspect, the present further provides an apparatus for sludge reduction treatment, comprising:

An aerobic treatment zone, which comprises a first inlet for receiving a first sludge, a second inlet for receiving at least part of a second sludge and optionally a third inlet for receiving a sewage feed; wherein the first sludge is from a sewage biotreatment process; the aerobic treatment zone is used for receiving the first sludge, the second sludge and the sewage feed and performing aerobic treatment; the aerobic treatment can be performed in a manner of intermittent aeration or continuous aeration;

An anoxic treatment zone, which is used for processing the mixture solution from the aerobic treatment zone to form a supernatant and a second sludge; and A circulating device, which is used for circulating at least part of the second sludge back to the aerobic treatment zone.

According to some embodiments of the apparatus for sludge reduction treatment of the present invention, the circulating device is disposed to circulate at least 60%, preferably at least 65%, more preferably at least 70%, more preferably at least 75%, more preferably at least 80%, more preferably at least 85%, more preferably at least 90%, more preferably at least 93%, more preferably at least 95%, more preferably at least 98%, most preferably essentially 100% of the second sludge back to the aerobic treatment zone.

According to some embodiments of the apparatus for sludge reduction treatment of the present invention, the aerobic treatment zone is disposed to have an aerobic treatment time of 0.1-4 h, preferably 0.5-2 h, more preferably 0.5-1.5 h.

According to some embodiments of the apparatus for sludge reduction treatment of the present invention, the apparatus further comprises a device for recovering phosphorus for recovering gaseous phosphorus-containing compounds generated in the aerobic treatment zone and the anoxic treatment zone.

In another aspect, the present invention further provides a method for sewage treatment by sludge reduction, comprising: subjecting a sewage feed to an aerobic treatment, an anoxic treatment and/or a sedimentation treatment and a sewage biotreatment in order in a sewage biotreatment apparatus comprising an aerobic treatment zone such as an aerobic basin, an anoxic treatment zone such as a sedimentation basin and a biotreatment zone, characterized by: circulating at least part of a first sludge that is present and/or formed in the biotreatment zone and at least part of a second sludge that is present and/or formed in the anoxic treatment zone back to the aerobic treatment zone so that the sludge is reduced simultaneously when the sewage feed is subjected to biotreatment.

In another aspect, the present invention further provides a method for sewage treatment by sludge reduction, comprising the following steps:

(a) Introducing a sewage feed and at least part of a second sludge from the step (d) and at least part of a first sludge from the step (g) into an aerobic treatment zone, preferably an aeration basin;

(b) Subjecting the mixture solution in the aerobic treatment zone to aerobic treatment;

(c) Introducing the mixture solution from the aerobic treatment zone to an anoxic treatment zone, preferably a sedimentation basin, for anoxic treatment to obtain a second sludge and a supernatant;

(d) Circulating at least part of the second sludge back to the aerobic treatment zone, and optionally discharging the residual part of the second sludge, wherein the discharged residual part of the second sludge has a total MLSS less than the total MLSS of the at least part of the first sludge that is introduced into the aerobic treatment zone of the step (a);

(e) Introducing the supernatant separated out from the anoxic treatment zone and optional other sewage feeds into the sewage biotreatment zone;

(f) Subjecting the supernatant and the optional other sewage feeds to a biotreatment process to obtain the first sludge and a water effluent;

(g) Circulating at least part of the first sludge back to the aerobic treatment zone, optionally circulating another part of the first sludge back to the sewage biotreatment zone, and optionally discharging the residual part of the first sludge;

wherein the aerobic treatment can be carried out in a manner of intermittent aeration or continuous aeration.

According to some embodiments of the method for sewage treatment by sludge reduction of the present invention, in the step (d), at least 60%, preferably at least 65%, more preferably at least 70%, more preferably at least 75%, more preferably at least 80%, more preferably at least 85%, more preferably at least 90%, more preferably at least 93%, more preferably at least 95%, more preferably at least 98%, most preferably essentially 100% of the second sludge is circulated back to the aerobic treatment zone.

According to some embodiments of the method for sewage treatment by sludge reduction of the present invention, in the step (g), at least 60%, preferably at least 65%, more preferably at least 70%, more preferably at least 75%, more preferably at least 80%, more preferably at least 85%, more preferably at least 90%, more preferably at least 93%, more preferably at least 95%, more preferably at least 98%, most preferably essentially 100% of the first sludge is circulated back to the aerobic treatment zone.

According to some embodiments of the method for sewage treatment by sludge reduction of the present invention, in the step (b), the aerobic treatment time is 0.1-4 h, preferably 0.5-2 h, more preferably 0.5-1.5 h.

According to some embodiments of the method for sewage treatment by sludge reduction of the present invention, the mixture solution in the aerobic treatment zone has an outlet dissolved oxygen content of 0.1 to 4 mg/L, preferably 1.5 to 3 mg/L, more preferably 2 to 3 mg/L after the aerobic treatment.

According to some embodiments of the method for sewage treatment by sludge reduction of the present invention, the aerobic treatment zone has a sluge concentration of 3,000 to 30,000 mg/L, preferably 3,000 to 20,000 mg/L, more preferably 4,000 to 15,000 mg/L.

According to some embodiments of the method for sewage treatment by sludge reduction of the present invention, the method further comprises a step for recovering gaseous phosphorus-containing compounds.

According to some embodiments of the method for sewage treatment by sludge reduction of the present invention, the biotreatment process of the step (f) is a sewage biotreatment process selected from Wuhrmann process, A/O process, Bardenpho process, Phoredox process, $A^2/O$ process, reversed $A^2/O$ process, UCT process, MUCT process, VIP process, OWASA process, JHB process, TNCU process, Dephanox process, BCFS process, MSBR process, SBR process, AB process, oxidation ditch process, biomembrane process, moving bed process and a combination thereof.

In another aspect, the present invention further provides an apparatus for sewage treatment by sludge reduction, the apparatus comprising: an aerobic treatment zone such as an aeration basin, an anoxic treatment zone such as a sedimentation basin and a sewage biotreatment zone, which are communicated in order, characterized in that: the aerobic treatment zone has a sewage feed inlet, a second sluge runback conduit communicating with the anoxic treatment zone, and a first sluge runback conduit communicating with the sewage biotreatment zone, and the apparatus for sewage biotreatment is disposed so that the total MLSS of the second sludge discharged from the anoxic treatment zone is less than the total MLSS of the first sludge circulated from the sewage biotreatment zone to the aerobic treatment zone.

In another aspect, the present invention further provides an apparatus for sewage treatment by sludge reduction, comprising:

An aerobic treatment zone, preferably an aeration basin, which comprises a first inlet for receiving a first sludge, a second inlet for receiving at least part of a second sludge and a third inlet for receiving a sewage feed; wherein the aerobic treatment zone is used for performing aerobic treatment of the first sludge, the second sludge and the sewage feed; the aerobic treatment can be performed in a manner of intermittent aeration or continuous aeration;

An anoxic treatment zone, preferably a sedimentation basin, which is used for anoxic treatment of the mixture solution from the aerobic treatment zone to form a supernatant and a second sludge;

A sewage biotreatment zone, optionally having an inlet for other sewage feeds, which is used for performing biotreatment of the supernatant and optional other sewage feeds to form the first sludge and a water effluent;

A first circulating device, which is used for circulating at least part of the first sludge back to the aerobic treatment zone;

A second circulating device, which is used for circulating at least part of the second sludge back to the aerobic treatment zone;

An optional first sludge discharging device for discharging the residual part of the first sludge; and An optional second sludge discharging device for discharging the residual part of the second sludge.

According to some embodiments of the apparatus for sewage treatment by sludge reduction of the present invention, the second circulating device is disposed to circulate at least 60%, preferably at least 65%, more preferably at least 70%, more preferably at least 75%, more preferably at least 80%, more preferably at least 85%, more preferably at least 90%, more preferably at least 93%, more preferably at least 95%, more preferably at least 98%, most preferably essentially 100% of the second sludge back to the aerobic treatment zone.

According to some embodiments of the apparatus for sewage treatment by sludge reduction of the present invention, the first circulating device is disposed to circulate at least 60%, preferably at least 65%, more preferably at least 70%, more preferably at least 75%, more preferably at least 80%, more preferably at least 85%, more preferably at least 90%, more preferably at least 93%, more preferably at least 95%, more preferably at least 98%, most preferably essentially 100% of the first sludge back to the aerobic treatment zone.

According to some embodiments of the apparatus for sewage treatment by sludge reduction of the present invention, the aerobic treatment zone is disposed to have an aerobic treatment time of 0.1-4 h, preferably 0.5-2 h, more preferably 0.5-1.5 h.

According to some embodiments of the apparatus for sewage treatment by sludge reduction of the present invention, the apparatus further comprises a device for recovering phosphorus for recovering gaseous phosphorus-containing compounds generated in the sewage treatment apparatus.

According to some embodiments of the apparatus for sewage treatment by sludge reduction of the present invention, the biotreatment zone is a device capable of performing sewage biotreatment according to Wuhrmann process, A/O process, Bardenpho process, Phoredox process, $A^2/O$ process, reversed $A^2/O$ process, UCT process, MUCT process, VIP process, OWASA process, JHB process, TNCU process, Dephanox process, BCFS process, MSBR process, SBR process, AB process, oxidation ditch process, biomembrane process, moving bed process and a combination thereof.

The inventors of the present invention surprisingly found that the above method for sludge treatment or sludge reduction treatment can achieve a long-term operation without sludge discharge and sludge accumulation. Hence, the method for sludge treatment or sludge reduction of the present invention can essentially eliminate sludge discharge and thoroughly solve the problems of sludge discharge, and thus can bring about significant social and economic benefits.

The above method for sludge treatment or sludge reduction can be readily applied to any suitable methods for sewage biotreatment to form a new method for sewage biotreatment. In particular, the residual sludge generated in the methods for sewage biotreatment can be treated and digested by the method for sludge treatment of the present invention. In addition, the water effluent (supernatant) produced by the method for sludge treatment of the present invention usually is neutral (i.e., pH=6 to 8, especially 6.5 to 7.5), so that it can be subjected to further sewage biotreatment without adjusting pH to obtain a purified water effluent in conformity with effluent standard. More particularly, the method for sewage biotreatment of the present invention can achieve good phosphorus-removing effects even without sludge discharge.

In compared with conventional methods for sewage biotreatment, the new method for sewage biotreatment can significantly reduce and even totally eliminate sludge discharge, and have advantages of good sewage treatment effects and good quality of water effluent, small floor space for constructs, small cost for construction and operation as well as high resistance to shock load and good stability during operation. The above method for sludge treatment or sludge reduction is particularly suitable for reform various existing apparatus for sewage biotreatment so as to significantly reduce and even totally eliminate sludge discharge.

BRIEF DESCRIPTION OF THE DRAWINGS

FIG. 7 is a schematic flow diagram of an AB process for sewage treatment suitable for the method for sewage biotreatment according to the present invention.

FIG. 8 is a schematic flow diagram of an A/O process for sewage treatment suitable for the method for sewage biotreatment according to the present invention.

FIG. 9 is a schematic flow diagram of an $A^2O$ process for sewage treatment suitable for the method for sewage biotreatment according to the present invention.

DETAILED DESCRIPTION OF THE INVENTION

In order to further demonstrate the present invention, some preferable embodiments of the present invention are illustrated in combination with the drawings. It should be understood that these descriptions are merely used to illustrate some features and merits of the present invention, but do not intend to limit the protection scope of the claims of the present invention.

In the present invention, the term "sewage" refers to any organic contaminants-containing sewage that can be treated by a method for sewage biotreatment; such sewage includes any suitable industrial wastewater, domestic sewage and any combination thereof, especially domestic sewage from cities. The sewage can be a sewage in site produced, a sewage collected from sanitary sewer system, a sewage stored in sewage basin for a period of time, or a sewage obtained by subjecting a sewage to biological, chemical and/or physical treatments such as fermentation, acidic/basic adjusting, composition adjusting, concentration adjusting, sedimentation, filtration, centrifugation, etc.

In the present invention, the term "sewage biotreatment" refers to a process in which the organic contaminants in sewage are converted into stable and harmless substances by using the metabolism of microorganisms. According to the microorganism's requirement for oxygen, such processes can be divided into aerobic biotreatment, anaerobic biotreatment, etc.

Figure 1:
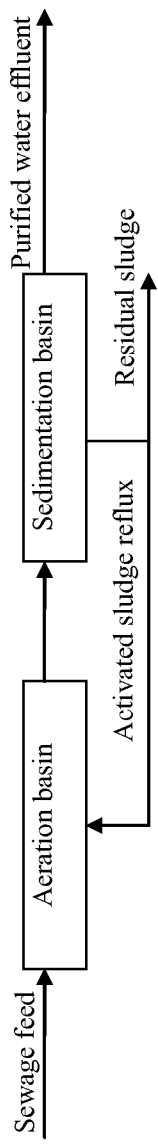
FIG. 1 is a schematic flow diagram for conventional activate sludge process.

According to the state of microorganisms in water, aerobic biotreatment can be divided into activated sludge process and biomembrane process. The activated sludge process is the most popular process for sewage biotreatment, in which air is fed into sewage containing a great amount of organic substances, after a certain time, bioflocs (activated sludge) are formed in water. A lot of microorganisms inhabit and live in the activated sludge and use organic substances in water as foodstuff to gain energy, grow and propagate, thereby purifying sewage. The basic flow of the activated sludge process is shown in FIG. 1. The biomembrane process comprises passing sewage through a solid packing on which a biomembrane in form of sludge is formed, so that a lot of microorganism propagated on the biomembrane can play the same role as the activated sludge in purifying sewage. Apparatus suitable for the biomembrane process comprises biofilter, rotating bio-disc, bio-contact oxidation reactor and fluidized bed bio-reactor.

Anaerobic biotreatment is a treatment process by degrading organic contaminants under anaerobic condition using facultative anaerobes and obligate anaerobes. Apparatus suitable for anaerobic biotreatment comprises common digester tank, anaerobic filter, anaerobic sludge bed, anaerobic rotating disc, anaerobic baffled reactor, etc.

Since sewage contains various contaminants, several processes are usually combined for achieve a desired purification effect. Typically, the processes for sewage biotreatment comprises, as examples, activated sludge process, OSA (Oxic-Settling-Anaerobic) process, anaerobic biotreatment processes (such as anaerobic biofilter, anaerobic rotating disc, anaerobic contact process, up-flow anaerobic sludge bed, sectioned anaerobic digestion process, etc.), Wuhrmann process, A/O process, Bardenpho process, Phoredox process, $A^2/O$ process, reversed $A^2/O$ process, UCT process, MUCT process, VIP process, OWASA process, JHB process, TNCU process, Dephanox process, BCFS process, SBR (Sequencing Batch Reactor Activaten Sludge Process), MSBR process, AB process, biomembrane process such as biofilter, bio-rotating disc, bio-contact oxidation process, fluidized bio-bed, aerating biofilter, an any combinations thereof.

In the present invention, the term "sludge" refers to any sludge that contains activated sludge generated in a sewage biotreatment process. The activated sludge is a floc formed with organisms in sewage, mainly comprises water and various microorganisms such as aerobic bacteria, anaerobic bacteria and facultative bacteria, as well as fungi, alga, protozoa, etc. With the acclimatization and environmental change, the various microorganism floras in sewage also change in amount and proportion and even gene mutation in order to adapt survivable environment. According to the sources of sewages, the examples of sewages comprise: a sludge from a secondary sedimentation basin of an activated sludge process (also called as residual sludge or residual activated sludge, mainly comprising microorganisms and water), a sludge from a secondary sedimentation process of a biomembrane process (also called as humic sludge, mainly comprising deciduous biomembrane), a sludge from primary settling basin of a sewage treatment plant (also called as primary sedimentation sludge, mainly comprising solid organics and microorganisms), a sludge from an anaerobic wastewater treatment process (also called as digestion sludge or mature sludge), a sludge from a chemical sedimentation basin (also called chemical sludge), etc. According to the stages in which sludge is generated, the examples of sludge comprises: raw sludge or fresh sludge (i.e., untreated sludge), concentrated sludge, digested sludge, dewatered sludge, dry sludge, etc. The sludge in the present invention can be any one of the above sludge or a combination thereof, especially a residual sludge having a water content of at least 90%, preferably at least 95%, more preferably at least 97%, and preferably a fresh sludge.

In the present invention, the term "mixed liquor" refers to a mixture formed with the above sludge and water, and is as called as "mixture of sludge and water" or "mixed liquor of sludge and water". Suitable mixed liquor has a good sedimentation property, and especially has not a phenomenon of sludge bulking or sludge floatation during aeration and sedimentation procedures. In general, a mixed liquor advantageously has a sludge volume index (SVI, such as $SVI_{30}$ which refers to the volume occupied by 1 g of activated sludge solid after 1000 mL of the mixed liquor stands in a 1000 mL volumetric cylinder for 30 minutes, the unit thereof is mL/g) less than the minimum SVI that sludge bulking occurs during aeration, for example, $SVI_{30}$ can be less than 200 mL/g, 150 mL/g, 100 mL/g, or 50 mL/g.

In the present invention, the term "concentrated mixed liquor" refers to a mixed liquor that has an elevated concentration of sludge and is obtained by separating the above mixed liquor to remove at least part of water. In some cases, the term "concentrated mixed liquor" is also called as sludge, for example, "first concentrated mixed liquor" may also be called as "first sludge". The "separating" step can be achieved by sedimentation, centrifugation, filtration, etc. In the case of sedimentation, sludge in a mixed liquor subsides downward to generate a supernatant at the upper portion of the mixed liquor and a concentrated mixed liquor with an elevated sludge concentration at the lower portion of the mixed liquor. In some cases, the lower portion used as the concentrated mixed liquor is 5 to 85% (such as: 5 to 10%, 10 to 15%, 15 to 20%, 20 to 25%, 25 to 30%, 30 to 35%, 35 to 40%, 40 to 45%, 45 to 50%, 50 to 55%, 55 to 60%, 65 to 70%, 70 to 75%, 75 to 80%, 80 to 85%) of the total mixed liquor.

In the present invention, the term "oxygen-supplying treatment/process" refers to a process allowing oxygen to contact with a mixed liquor, especially a process allowing an oxygen-containing gas (such as air) to contact with a mixed liquor. In the present invention, "oxygen-supplying treatment" can be realized by any methods that allow an oxygen-containing gas to contact with a mixed liquor. For example, it can be realized by feeding an oxygen-containing gas into a flowing or non-flowing mixed liquor, especially by aerating a mixed liquor with an oxygen-containing gas. Usually, aerobic treatment is a typical "oxygen-supplying treatment". In general, aerobic treatment can be performed under any suitable conditions in any suitable manners, for example, under a condition such as normal pressure, positive pressure, room temperature, low or high temperature in a manner such as airblast aeration, mechanical aeration, jet aeration in a suitable device such as aeration basin, aeration ditch, fluidized bed, moving bed or membrane, etc. Aeration basin is preferably used for aeration. Any suitable oxygen-containing gases can be used for aeration, and air is preferably used for aeration. During oxygen-supplying treatment, the dissolved oxygen concentration in a mixed liquor can be gradually elevated to a desired level. The time for oxygen-supplying treatment usually is determined by the retention time of the mixed liquor in an oxygen-supplying treatment device or the time that the mixed liquor contacts with oxygen and the amount of the oxygen-containing gas fed in the mixed liquor. Usually, during the oxygen-supplying treatment, the growth of aerobes and facultative organism is enhanced, while anaerobes are inhibited.

In the present invention, the term "anoxic treatment/process" refers to a process allowing a mixed liquor essentially not to contact with an oxygen-containing gas. Anoxic treatment can be realized in any manner that can essentially avoid the contact between an oxygen-containing gas and a mixed liquor. For example, anoxic treatment can be realized by stopping aeration and an optional degassing step. In the present invention, a mixed liquor is subjected to an anoxic treatment as long as there essentially is not dissolved oxygen, e.g., when dissolved oxygen level is lower than 0.1 mg/L, whether nitrate nitrogen exists or not. That is, the anoxic treatment of the present invention can be performed under anoxic conditions (in the presence of nitrate nitrogen and the absence of dissolved oxygen) or anaerobic conditions (in the absence of nitrate nitrogen and dissolved oxygen) as mentioned in the prior art. In some cases, with the escape of oxygen-containing gas and the consumption of dissolved oxygen, the concentration of dissolved oxygen gradually decreases to a desired value, such as about 0 mg/L. In particular, anoxic treatment can be realized by stopping aeration and allowing the mixed liquor slowly flow in a sedimentation basin. Suitable sedimentation basin can be a horizontal flow basin, vertical flow basin or radial flow basin. The time for anoxic treatment usually is determined by the retention time of a mixed liquor in an anoxic treatment device. In general, during anoxic treatment, the growth of anaerobes and facultative organisms is enhanced, while aerobes are inhibited.

In the present invention, the term "sludge content" usually refers to the content of solids or suspended solids in a sludge or sewage or a mixed liquor or a concentrated mixed liquor. In general, the solids or suspended solids mainly comprise organisms or organic solid substances (including biodegradable and non-biodegradable organic substances). In some cases, sludge content can also be expressed as total amount of MLSS (mixed liquor suspended solids), which is also called as "mixed liquor sludge concentration", referring to the total weight of activated sludge solid (mg/L) in one unit volume of the mixed liquor in aeration basin.

In one aspect, the present invention provides a method for sludge treatment, comprising the following steps: (1) mixing a sludge feed from a sewage biotreatment process with a first mixed liquor to obtain a second mixed liquor; (2) subjecting the second mixed liquor to an oxygen-supplying process to obtain a third mixed liquor; (3) subjecting the third mixed liquor to an anoxic process to obtain a fourth mixed liquor; (4) separating the fourth mixed liquor to obtain a supernatant liquid and a first concentrated mixed liquor; (5) discharging the supernatant liquid, and returning at least a part of the first concentrated mixed liquor as the first mixed liquor to the step (1), wherein the amount of sludge of the first concentrated mixed liquor that does not return to the step (1) is less than the amount of sludge of the sludge feed.

Figure 2:
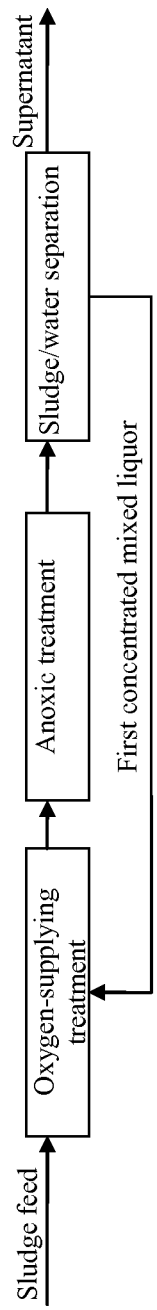
FIG. 2 is a schematic flow diagram for an embodiment of the method for sludge treatment according to the present invention.

According to the method for sludge treatment of the present invention, the amount of sludge of the first concentrated mixed liquor that does not return to the step (1) is less than the amount of sludge of the sludge feed, that is to say, there is a net input of sludge. In particular, when all of the first concentrated mixed liquor returns to the step (1), the amount of sludge of the net input of sludge is equal to the amount of sludge of the sludge feed (see also FIG. 2).

The inventors of the present invention surprisingly find that during a long term running, although there is a net input of sludge, the amount of sludge in the mixed liquor still maintains at a relatively stable level and does not increase unlimitedly, this level is influenced by the composition and flow rate of the sludge feed and other operation conditions, and when there is a sewage feed, it is also influenced by the composition and flow rate of the sewage feed. Hence, the method for sludge treatment of the present invention is actually a method for sludge treatment by sludge reduction. Namely, the method for sludge treatment of the present invention can digest the sludge in the sludge feed so as to reduce the amount of sludge. In a preferable embodiment, the method for sludge treatment of the present invention can run for a long term without discharging any sludge when a sludge feed is continuously added, thereby removing sludge discharge. In addition, the inventors of the present invention also surprisingly find that even when the sludge feed contains a relatively high level of carbon, nitrogen and phosphorus and the first concentrated mixed liquor does not discharge, the contents of carbon, nitrogen and phosphorus in the supernatant can also maintain at a relatively low level, namely, the method for sludge treatment of the present invention can achieve significant effects of removing carbon, nitrogen and phosphorus.

Without being limited to any theories, the inventors of the present invention think some reasons that the method for sludge treatment of the present invention can run for a long term without discharging sludge are as follows.

Firstly, it is a general assumption that when the amount of discharged sludge is less than that of added sludge, the amount of sludge in the mixed liquor would increase continuously, however, in practices, the sludge concentration in the mixed liquor stably does not increase continuously but maintains at a relatively high level during a stable running (namely, during a stable running, the amount of sludge in system essentially unchanged). Hence, it can be deemed that the organism floras in the mixed liquor is of a balance state of digestion and growth, i.e., the newly increased amount of sludge (including the amount of sludge in the sludge feed and the amount of sludge increased by growth of organisms in the mixed liquor) and the reduced amount of sludge caused by death and digestion of organisms reach a dynamically balanced state, so that there is not a net increment of amount of sludge.

In known sewage biotreatment processes, there is always a residual sludge discharge due to the propagation of organisms, whether a sludge from a secondary sedimentation basin returns or not to the upstream of process. As for the whole process, the amount of sludge discharged is always greater than the amount of sludge added. In addition, since the concentration of water soluble organics in the water effluent from second basin must be at a relatively low level to meet the requirements of water discharge, a sufficiently high aeration rate and a sufficiently long period of aeration time must be adopted to reduce the concentration of soluble organics in water. However, under aerobic conditions, a low concentration of organics usually facilitates the propagation of filamentous colony, thereby resulting sludge bulking. In the meantime, high aeration rate and long aeration time also increase the possibility that sludge bulking occurs in a mixed liquor having a relatively high sludge concentration. Hence, in various known activated sludge processes, the concentration of sludge in aeration basin usually can hardly reach a relatively high level, namely, cannot reach a balance state of digestion and growth in floras of organisms. Furthermore, since the resistance of organisms against severe environment (such as low nutrient concentration), the known activated aerobic treatment processes and anaerobic treatment processes in the art usually can digest not more than 60% of sludge (i.e., cannot digest all sludge). Hence, these processes still need to discharge an amount of residual sludge.

The method for sludge treatment of the present invention mainly aims to digest sludge, so that the concentration of water soluble organics in the discharged supernatant is not restricted and can be of a relatively high level, thereby advantageously restricting the propagation of filamentous bacteria, reducing oxygen demand (such as aeration rate) and the possibility of sludge bulking during oxygen-supplying treatment such as aeration. In addition, a relatively high level of soluble organics also provide sufficient nutrients for organisms, forms a better environment facilitating the metabolism, propagation and programmed cell death of organisms.

In addition, in the method for sludge treatment of the present invention, the sludge alternatively and repeatedly experiences oxygen-supplying treatment and anoxic treatment, which facilitates the propagation of zooglea and improves sedimentation rate of sludge and clarifying effects. Hence, the method for sludge treatment can achieve a relatively high sludge concentration without sludge bulking Further, since the most or even all of the first concentrated mixed liquor returns to the step (1), the sludge age is relatively long (e.g., several months, years or even longer). Hence, the microorganisms, which have a relatively slow propagation rate and can digest those usually non-biodegradable substances, can grow and enhance the decomposition ability of sludge. In the meantime, both biodegradable and usually non-biodegradable substances (including dead organisms) in the mixed liquor pass through oxygen-supplying treatment and anoxic treatment in sequence under conditions of high sludge concentration and thus are rapidly digested, so that compounds containing carbon, nitrogen and phosphorus are converted into soluble organics that can be discharged with the supernatant or into volatile substances that escape out.

In sum, in the method for sludge treatment of the present invention, the sludge in the mixed liquor has good sedimentation property and low oxygen demand (such as aeration rate) and can degrade various organic substances (including dead organism) to form water soluble substances or gaseous substances, so that the mixed liquor can have a relatively high sludge concentration to allow the floras of organism at a balance state of digestion and growth without sludge bulking, and the method for sludge treatment of the present invention can stably run for a long term and reduce or even totally eliminate sludge discharge.

In some embodiments, the oxygen-supplying treatment of the step (2) and the anoxic treatment of the step (3) can be performed in the same one construct or container in a sequencing manner. For example, the steps (1) to (4) can be performed in the same construct or container, in which a first batch of sludge feed is mixed in the step (1) with a first concentrated mixed liquor which is generated in the treatment of a previous sludge feed and used as a first mixed liquor to obtain a second mixed liquor, the second mixed liquor is subjected to oxygen-supplying treatment in the step (2) to obtain a third mixed liquor, the third mixed liquor is subjected to anoxic treatment in the step (3) to obtain a fourth mixed liquor, the fourth mixed liquor is separated in the step (4) to obtain a supernatant and a first concentrated mixed liquor, in the step (5), the supernatant is discharged and at least part (preferably all) of the first concentrated mixed liquor stays in the construct or container and is used as a first mixed liquor in the step (1), and then the next batch of sludge feed is introduced in the construct or container and the above steps are repeated. In the step (5), the supernatant can be discharged by a device capable of discharging the supernatant, such as a drain pipe. The use of this sequencing manner has advantages of reducing floor space and construction cost. In some cases, the oxygen-supplying treatment of the step (2) and the anoxic treatment of the step (3) can be repeated once or more before separation of the step (4).

In some embodiments, in the method for sludge treatment of the present invention, the oxygen-supplying treatment of the step (2) and the anoxic treatment of the step (3) can be performed in different constructs or containers in a semi-continuous or continuous manner. For example, the steps (1) to (5) can be preformed in different constructs in a semi-continuous (i.e., some of the steps are performed in continuous manner while some other steps are performed in intermittent manner) or continuous manner, in which in the step (1), a sludge feed is intermittently or continuously introduced in a first construct and mixed with a first mixed liquor to obtain a second mixed liquor, the second mixed liquor is intermittently or continuously introduced in a second construct and subjected to the oxygen-supplying treatment of the step (2) to obtain a third mixed liquor, the third mixed liquor is intermittently or continuously introduced in a third construct and subjected to the anoxic treatment of the step (3) to obtain a fourth mixed liquor, the fourth mixed liquor intermittently or continuously passes through a separator and subjected to the separation of the step (4) to obtain a supernatant and a first concentrated mixed liquor, in the step (5), the supernatant is intermittently or continuously discharged, and at least part of the first concentrated mixed liquor is intermittently or continuously introduced into the first construct, and the residual part of the first concentrated mixed liquor is optionally discharged intermittently or continuously. The first, second and third construct can be different independent constructs or different zones of the same one construct. If the anoxic treatment of the step (3) is performed in sedimentation manner, the separation of the step (4) can also be performed in the same construct of the step (3) (i.e., the third construct can also be used as a separator). In the step (5), the supernatant can discharge the supernatant by a device capable of discharging the supernatant, such as a drain pipe, the first concentrated mixed liquor can be introduced to the first construct via for example a sludge return pipe. The use of semi-continuous or continuous manner can advantageously improve the efficiency of sludge treatment. In order to obtain optimum sludge treatment effects, various steps can be performed in intermittent or continuous manner according to the flow rate and composition of the sludge feed and the operation conditions of devices.

In the method for sludge treatment of the present invention, the sludge amount of the first mixed liquor that does not return to the step (5) is less than the sludge amount of the sludge feed. In some cases, in the step (5), essentially all of the first concentrated mixed liquor returns to the step (1) as the first mixed liquor, so that the first concentrated mixed liquor is essentially not discharged. However, it is possible that in come cases, the sludge amount of the discharged part of the first concentrated mixed liquor is instantaneously greater than the sludge amount of the sludge feed, as long as during a long term running, the discharged part of the first concentrated mixed liquor has an average sludge amount less than the average sludge amount of the sludge feed so that there is a net input of sludge amount. According to some embodiments of the method for sludge treatment of the present invention, in the step (5), the sludge amount of the first concentrated mixed liquor that does not return to the step (1) is of a proportion of at most, for example, about 95%, about 85%, about 70%, about 50%, about 30%, about 25%, about 20%, about 15%, about 10%, about 5%, about 3%, about 1%, about 0% of the sludge amount of the sludge feed. The proportion is preferably about 0%, which is to say that essentially all the first concentrated mixed liquor returns to the step (1) and is used as the first mixed liquor. In addition, this proportion is advantageously less than about 30%, about 25%, about 20%, about 15%, about 10%, about 5%, about 3%, about 1%, especially about 0%, to achieve a relatively long sludge age. Without being limited to any theory, long sludge age enable the growth of microorganisms that propagate slowly and can digest those usually non-biodegradable substances, thereby enhancing the decomposition ability of sludge. In the meantime, the proportion can be less than about 30%, about 25%, about 20%, about 15%, about 10%, about 5%, about 3%, about 1%, especially be about 0%, and thus facilitate the elevation the sludge concentration of the first, second, third and fourth mixed liquors.

In some embodiments, the flow rate of the first concentrated mixed liquor can be 10% to 1000%, for example, 10 to 20%, 20 to 30%, 30 to 40%, 40 to 60%, 60 to 80%, 80 to 100%, 100 to 150%, 150 to 200%, 200 to 400%, 400 to 600%, 600 to 800%, 800 to 1000% of the flow rate of the sludge feed, or in the presence of a sewage feed, the total flow rate of the sewage feed and the sludge feed. This proportion is also called as the reflux ratio of the first concentrated mixed liquor. A suitable reflux ratio can advantageously enable the oxygen-supplying treatment time and/or anoxic treatment time to be desired values. In some cases, suitable reflux ratio can be relatively small, such as 10 to 20%, 20 to 30%, 30 to 40%, 40 to 60% in order to advantageously reduce power consumption. In some other cases, suitable reflux ratio can be relatively great, such as 60 to 80%, 80 to 100%, 100 to 150%, 150 to 200%, 200 to 400%, 400 to 600%, 600 to 800%, 800 to 1000% in order to a shorter oxygen-supplying treatment time and/or anoxic treatment time. The preferable reflux ratio can be 50 to 150%.

In some embodiments of the method for sludge treatment of the present invention, the oxygen-supplying treatment time of the step (2) is less than the time that aerobic microorganisms become dominant colony (for example, less than the generation cycle of aerobic microorganism, such as less than 5 hours), and the anoxic treatment time of the step (3) is less than the time that anaerobic microorganisms become dominant colony (for example, less than the generation cycle of aerobic microorganism, such as less than about 40 hours) so that facultative microorganisms become dominant colony. Without being limited by any theory, since facultative microorganisms have a generation cycle of about 0.2 to 0.5 hours at room temperature, in a sludge with facultative microorganisms as dominant colony, the growth and programmed cell death of a larger number of microorganisms would occur during alternative oxygen-supplying treatment (aerobic conditions) and anoxic treatment (anoxic or anaerobic conditions), thereby digesting and degrading (via metabolism and hydrolysis) various organic substances (including dead organisms) to form soluble substances that are discharged out with the supernatant or form gaseous substances that escape out, especially at high sludge concentration condition.

In some embodiments, the oxygen-supplying treatment time of the step (2) can be less than such as 5 hours so that aerobic microorganisms would not become dominant colony, and can also be greater than such as 0.1 hours so that the propagation of anaerobic microorganisms is inhibited while facultative microorganisms can sufficiently propagate and become dominant colony. In some cases, the oxygen-supplying treatment can be 0.1 to 4 hours, preferably 0.5 to 2 hours, more preferably 0.5 to 1.5 hours, for example, 0.1 to 0.2 hours, 0.2 to 0.3 hours, 0.3 to 0.4 hours, 0.4 to 0.5 hours, 0.5 to 0.6 hours, 0.6 to 0.8 hours, 0.8 to 1 hours, 1 to 1.2 hours, 1.2 to 1.5 hours, 1.5 to 1.8 hours, 1.8 to 2 hours, 2 to 2.2 hours, 2.2 to 2.5 hours, 2.5 to 3 hours or 3.5 to 4 hours. In some embodiments, the oxygen-supplying treatment of the step (2) is performed in a manner of intermittent aeration or continuous aeration.

In some embodiments, the anoxic treatment time of the step (3) can be less than for example 6 hours so that anaerobic microorganisms would not become a dominant colony and the size of apparatus can be advantageously reduced, while in the meantime, the anoxic treatment time of the step (3) can be greater than for example 0.1 hours so that facultative microorganisms can sufficient propagate and aerobic microorganisms are inhibited to allow facultative microorganisms become dominant colony. The anoxic treatment time can be 0.8 to 6 hours, preferably 1 to 4 hours, more preferably 1 to 3 hours, for example, 0.8 to 1 hours, 1 to 1.2 hours, 1.2 to 1.4 hours, 1.4 to 1.6 hours, 1.6 to 1.8 hours, 1.8 to 2 hours, 2 to 2.5 hours, 2.5 to 3 hours, 3 to 3.5 hours, 3.5 to 4 hours, 4 to 4.5 hours, 4.5 to 5 hours, 5 to 5.5 hours or 5.5 to 6 hours. In some embodiments, the anoxic treatment of the step (3) is performed in sedimentation manner. When the anoxic treatment is performed in sedimentation manner, the anoxic treatment time can be advantageous greater than 0.5 hours, especially greater than 1 hour, so that the sedimentation can be completed sufficiently, and the anoxic treatment time can also be less than 4 hours to reduce the size of apparatus.

In some embodiments, the ratio of the oxygen-supplying treatment time to the anoxic treatment time can be 1:0.5 to 1:6, preferably 1:1 to 1:3, more preferably 1:1.5 to 1:2, most preferably 1:2, for example, 1:0.5 to 1:0.6, 1:0.6 to 1:0.7, 1:0.7 to 1:0.8, 1:0.8 to 1:0.9, 1:0.9 to 1:1, 1:1 to 1:1.1, 1:1.1 to 1:1.2, 1:1.2 to 1:1.3, 1:1.3 to 1:1.4, 1:1.4 to 1:1.5, 1:1.5 to 1:1.6, 1:1.6 to 1:1.7, 1:1.7 to 1:1.8, 1:1.8 to 1:1.9, 1:1.9 to 1:2, 1:2 to 1:2.1, 1:2.1 to 1:2.2, 1:2.3 to 1:2.4, 1:2.4 to 1:2.5, 1:2.5 to 1:2.6, 1:2.6 to 1:2.8, 1:2.8 to 1:3, 1:3 to 1:3.2, 1:3.2 to 1:3.4, 1:3.4 to 1:3.6, 1:3.6 to 1:3.8, 1:3.8 to 1:4, 1:4 to 1:4.5, 1:4.5 to 1:5, 1:5 to 1:5.5 or 1:5.5 to 1:6, so that facultative microorganisms become a dominant colony.

In some embodiments, in order to allow that the sludge undergoes sufficient oxygen-supplying treatment so that facultative microorganisms become a dominant colony and the digestion and hydrolysis of sludge is promoted, the dissolved oxygen content of the third mixed liquor of the step (2) can be 0.1 to 4 mg/L, preferably 1.5 to 3 mg/L, more preferably 2 to 3 mg/L, for example, 0.1 to 0.3 mg/L, 0.3 to 0.5 mg/L, 0.5 to 0.7 mg/L, 0.7 to 0.9 mg/L, 0.9 to 1.1 mg/L, 1.1 to 1.3 mg/L, 1.3 to 1.5 mg/L, 1.5 to 1.7 mg/L, 1.7 to 1.9 mg/L, 1.9 to 2.1 mg/L, 2.1 to 2.3 mg/L, 2.3 to 2.5 mg/L, 2.5 to 2.7 mg/L, 2.7 to 2.9 mg/L, 2.9 to 3.1 mg/L, 3.1 to 3.3 mg/L, 3.3 to 3.5 mg/L, 3.5 to 3.7 mg/L or 3.7 to 3.9 mg/L.

In some embodiments, the sludge feed is subjected to an oxygen-supplying treatment before the step (1). Without being limited to any theory, it is considered that this facilitates that facultative microorganisms become dominant colony. In addition, when the sludge feed is from a secondary sedimentation basin of activated process, since the content of organic substances in such sludge feed is relatively low, the microorganisms in the sludge feed during the oxygen-supplying treatment would mainly undergo endogenous digestion thereby reducing the amount of sludge. In the meantime, such oxygen-supplying treatment can also reduce the oxygen demand (such as aeration rate) of the oxygen-supplying treatment of the step (2); thereby further reducing the risk of occurring sludge bulking In some embodiments, the oxygen-supplying treatment time of the sludge feed can be 0.1 to 0.5 hours, 0.5 to 1 hours, 1 to 1.5 hours, 1.5 to 2 hours or 2 to 2.5 hours, and the dissolved oxygen content of the such treated sludge feed can be 0.1 to 0.5 mg/L, 0.5 to 1 mg/L, 1 to 1.5 mg/L, 1.5 to 2 mg/L, 2 to 2.5 mg/L, 2.5 to 3 mg/L, 3 to 3.5 mg/L or 3.5 to 4 mg/L. In some embodiments, such oxygen-supplying treatment is performed in intermittent or continuous manner, for example, in a manner of intermittent aeration or continuous aeration.

In some embodiments, in order to allow that the sludge undergoes sufficient anoxic treatment so that facultative microorganisms become dominant colony and the digestion and hydrolysis of sludge is promoted, the third mixed liquor can be deoxygenated between the step (2) and the step (3). For example, the deoxygenation can be performed by using a degassing basin, in which oxygen-containing bubbles float upward from the mixed liquor, so that the dissolved oxygen content in the mixed liquor would not rise to facilitate the following anoxic treatment. According to the method for sludge treatment of the present invention, the deoxygenation is performed for a time of 0.1 to 0.2 hours, 0.2 to 0.3 hours, 0.3 to 0.5 hours, 0.5 to 0.8 hours or 0.8 to 1 hours, the third mixed liquor after such treatment has a dissolved oxygen content of less than 0.1 mg/L, less than 0.05 mg/L or about 0 mg/L.

In some embodiments, the ratio of the oxygen-supplying treatment time : the deoxygenation time : the anoxic treatment time can be 1:(0.1 to 0.5):(0.5 to 4), preferably 1:(0.1 to 0.3):(1 to 3), more preferably 1:(0.1 to 0.2):(1.5 to 2.5), for example 1:0.1:1 or 1:0.15:2.

In some embodiments, in the method for sludge treatment of the present invention, the sludge feed can comprises one or more sludge feeds, preferably fresh sludge feeds, and these sludge feeds can be the same or different. Usually, the water content of the sludge feed can be for example at least 40%, at least 60%, at least 80%, at least 90%, at least 95%, at least 98% or more, preferably 97% or more. In some cases, the sludge feed can also be low water content sludge such as dry sludge, as well as a mixture thereof with water, sewage, organic nutrients or other sludge feeds.

According to some embodiments of the method for sludge treatment of the present invention, a sewage feed can also be introduced to the step (1) and mixed with the first mixed liquor. In the presence of the sewage feed, the flow rate ratio of the sludge feed to the sewage feed in the step (1) can be 1:100 to 1:50, 1:50 to 1:20, 1:20 to 1:10, 1:10 to 1:5, 1:5 to 1:2, 1:2 to 1:1.5, 1:1.5 to 1:1, 1:1 to 1:0.8, 1:0.8 to 1:0.5, 1:0.5 to 1:0.2, 1:0.2 to 1:0.1, 1:0.1 to 1:0.05, 1:0.05 to 1:0.02 or 1:0.02 to 1:0.01.

In some embodiments, the second mixed liquor in the step (2) has a sludge volume index (SVI, usually expressed as $SVI_{30}$, which refers to the volume occupied by 1 g of activated sludge solid after 1000 mL of the mixed liquor stands in a 1000 mL volumetric cylinder for 30 minutes, the unit thereof is mL/g) that is less than the minimum SVI that sludge bulking occurs during aeration, for example, $SVI_{30}$ can be less than 300 mL/g, 200 mL/g, 150 mL/g, 100 mL/g, or 50 mL/g.

In some embodiments, the sludge concentration of the second mixed liquor in the step (1) is of a concentration that allows the microorganisms at a balance state of digestion and growth. According to some embodiments, the second mixed liquor of the step (1) has a sludge concentration of at least about 2500 to 3000mg/L, 3000 to 3500mg/L, 3500 to 4000mg/L, 4000 to 4500mg/L, 4500 to 5000mg/L, 5000 to 5500mg/L, 5500 to 6000mg/L, 6000 to 6500mg/L, 6500 to 7000mg/L, 7000 to 7500mg/L, 7500 to 8000mg/L, 8000 to 8500mg/L, 8500 to 9000mg/L, 9000 to 9500mg/L, 9500 to 10000mg/L, 10000 to 12000mg/L, 12000 to 14000mg/L, 14000 to 16000mg/L, 16000 to 18000mg/L, 18000 to 20000mg/L or at least about 20000mg/L, preferably 3000 to 20000 mg/L, more preferably 4000 to 15000 mg/L.

In some embodiments, the above method for sludge treatment may further comprises a step for recovering gaseous phosphorus-containing compounds. The gaseous phosphorus-containing compounds include hydrogen phosphide and so on generated in the step (2) and/or step (3). For example, this recovery step and the step (2) and/or step (3) can be performed simultaneously to recovery gaseous phosphorus-containing compounds generated in the step (2) and/or step (3). This recovery step can be any suitable processes for recovering gaseous phosphorus-containing compounds, for example, a process capable of converting gaseous phosphorus-containing compounds into liquid or solid substances, for example, the gaseous phosphorus-containing compounds can be frozen, absorbed with an absorber via physical and/or chemical absorption. The absorber can be any substances capable of dissolving the gaseous phosphorus-containing compounds or substances capable of reacting with the gaseous phosphorus-containing compounds. For example, the substances capable of absorbing gaseous phosphorus-containing compounds include potassium permanganate solution, a mixed solution of potassium permanganate and caustic alkali, a ferric chloride solution, a sodium hypobromite solution, etc. As for hydrogen phosphide, it can be absorbed by using activated carbon as absorber, or oxidized with ozone to form low toxic substances, or burned under controlled combustion conditions.

In another aspect, the present invention further provides a method for sewage biotreatment, comprising:

(1) Mixing a sludge feed from a sewage biotreatment process with a first mixed liquor to obtain a second mixed liquor;

(2) Subjecting the second mixed liquor to an oxygen-supplying process to obtain a third mixed liquor;

(3) Subjecting the third mixed liquor to an anoxic process to obtain a fourth mixed liquor;

(4) Separating the fourth mixed liquor to obtain a supernatant liquid and a first concentrated mixed liquor;

(5) Discharging the supernatant liquid, and returning at least a part of the first concentrated mixed liquor as the first mixed liquor to the step (1), wherein the amount of sludge of the first concentrated mixed liquor that does not return to the step (1) is less than the amount of sludge of the sludge feed;

(6) Subjecting at least a part of the supernatant liquid from the step (5) and optionally a part of sewage feed to the sewage biotreatment process to obtain a second concentrated mixed liquor and a purified water effluent; and (7) Discharging the purified water effluent and optionally returning at least part of the second concentrated mixed liquor from the step (6) as the sludge feed to the step (1);

Wherein a sewage feed is introduced to the step (1) and mixed with the sludge feed and the first mixed liquor to obtain the second mixed liquor and/or introduced to the step (6) and subjected to the sewage biotreatment process together with the at least part of supernatant from the step (5).

It can be seen that the steps (1) to (5) form the above method for sludge treatment of the present invention. Thus, the method for sewage biotreatment of the present invention is actually an application of the method for sludge treatment of the present invention in sewage biotreatment. Since the supernatant discharged from the method for sludge treatment usually contains a relatively high concentration of soluble organic contaminants, the supernatant usually should be further treated to meet discharge standards safety for environment. Hence, in some embodiments, a sewage feed is introduced in the step (1), so that the method for sludge treatment of the present invention formed with the steps (1) to (5) can be used as a first stage of biotreatment before the sewage biotreatment of the step (6) which is used as a second stage of biotreatment, the sewage feed further undergoes the first stage of biotreatment to form the supernatant, then the supernatant is used as a feed and treated by the second biotreatment to obtain the purified water effluent. Preferably, the purified water effluent is environmentally safe and meets discharge requirements. In the meantime, the residual sludge (i.e., the second concentrated mixed liquor) generated in the second stage biotreatment can be used as the sludge feed and digested in the first stage of biotreatment, thereby facilitating the reduction or even elimination of sludge discharge of the whole sewage treatment process. In some embodiments, a sewage feed is introduced in the step (6), so that in view of the sewage feed, the method for sludge treatment of the present invention which is formed with the steps (1) to (5) is after the sewage biotreatment of the step (6), and is mainly used to digest the residual sludge (i.e., the second concentrated mixed liquor) generated in the sewage biotreatment of the step (6). In the meantime, the supernatant can also be used as sewage feed and introduced into the step (6). In further other embodiments, sewage feeds can be introduced into the steps (1) and (6) simultaneously.

In some embodiments, 1 to 10%, 10 to 20%, 20 to 30%, 30 to 40%, 40 to 50%, 50 to 60%, 60 to 70%, 70 to 80%, 80 to 85%, 85 to 90%, 90 to 95% or 95 to 100%, especially about 100% of the second concentrated mixed liquor is used as the sludge feed of the step (1) to facilitate the use of the above method for sludge treatment to digest at least part or even all of the second concentrated mixed liquor, thereby reducing or even totally eliminating the sludge discharge of the whole sewage biotreatment process. In some embodiments, the proportion of the second concentrated mixed liquor of the step (6) relative to the sludge feed of the step (1) is 1 to 10%, 10 to 20%, 20 to 30%, 30 to 40%, 40 to 50%, 50 to 60%, 60 to 70%, 70 to 80%, 80 to 85%, 85 to 90%, 90 to 95% or 95 to 100%.

According to the method for sewage treatment of the present invention, the above method for sludge treatment of the present invention as the first stage of biotreatment can be combined to any suitable sewage biotreatment process as the second stage of biotreatment. As compared to a sewage biotreatment process using only the second stage of biotreatment, the method for sewage biotreatment of the present invention can significantly reduce or even totally eliminate the discharge of residual sludge and can achieve better treatment effects.

In the method for sewage treatment of the present invention, if the sewage feed is introduced into both the step (1) and the step (6), the ratio of the sewage introduced into the step (1) to the sewage introduced into the step (6) can be any desired values in order to balance the loads of system and optimize the effects of whole sewage biotreatment.

In some embodiments, the sewage feed is advantageously introduced into the step (1). Since the mixed liquor of the step (1) has a very high sludge concentration, it advantageously has a resistance against shock loads of sewage feed in terms of water flow and contaminants. In the meantime, the high sludge concentration also can accelerate reaction rate to digest contaminants in the sewage feed effectively and rapidly, and some usually non-biodegradable substances can also be gradually degraded to form degradable substances, thereby improving the effects of sewage treatment, reducing the size of sewage treatment apparatus, saving floor space and reducing the cost of investment and operation. These features are particularly advantageous for treating sewage with a low COD such as sanitary sewage of cities, because the sludge treatment process formed with the steps (1) to (5) actually converts part of sludge feed into degradable substances and thus increases the COD of the supernatant, so that the sequent biotreatment of the supernatant can more effectively remove phosphorus and nitrogen from water, thereby improving the quality of the purified water. Hence, the present invention is particularly suitable for biotreatment of sewage with a COD less then 500mg/L, 350mg/L, 300mg/L, 250mg/L, 200mg/L, 150mg/L or 100mg/L. Certainly, when there is a deficiency of carbon source due to the imbalance of various contaminants in sewage feed, a suitable carbon source, for example alcohols such as methanol or other organic nutrients such as starches, molasses and so on can also be added to the sewage feed.

According to the method for sewage treatment of the present invention, any sewage biotreatment process (such as conventional aerobic sewage biotreatment processes and anaerobic sewage biotreatment processes) can be advantageously used as the sewage biotreatment of the step (6). In some embodiments, the sewage biotreatment process of the step (6) is Wuhrmann process, A/O process, Bardenpho process, Phoredox process, $A^2$/O process, reversed $A^2$/O process, UCT process, MUCT process, VIP process, OWASA process, JHB process, TNCU process, Dephanox process, BCFS process, MSBR process, SBR process, AB process, oxidation ditch process, biomembrane process, moving bed process or a combination thereof.

Figure 3:
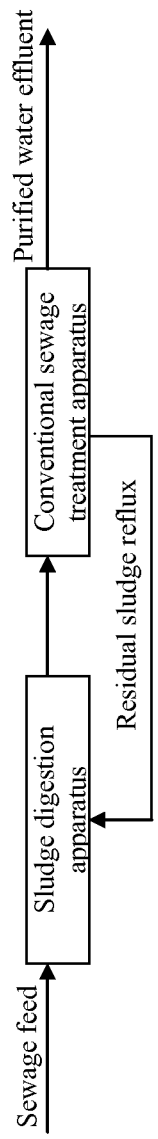
FIG. 3 is a schematic flow diagram for an embodiment of the method for sewage biotreatment or the method for sewage (bio-)treatment by sludge reduction according to the present invention.

FIG. 3 is a schematic flow diagram for an embodiment of the method for sewage biotreatment according to the present invention, in which "sludge digestion device" represents a device capable of performing the method for sludge treatment according to the present invention (i.e., steps (1) to (5)), "conventional sludge treatment device" represents any suitable sewage treatment device capable of performing the sewage biotreatment of the step (6), and "residual sludge reflux" represents the second concentrated mixed liquor that is used as the sludge feed of the step (1).

Figure 4:
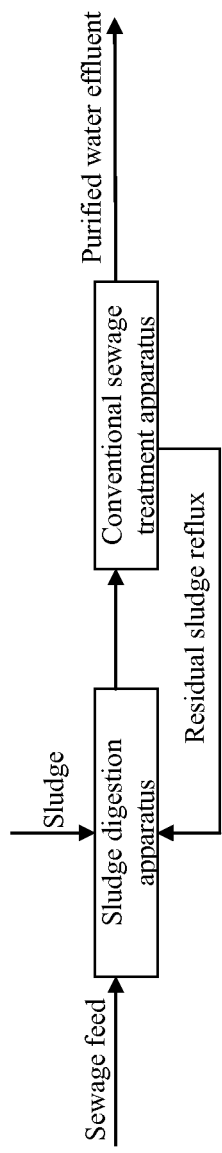
FIG. 4 is a schematic flow diagram for another embodiment of the method for sewage biotreatment or the method for sewage biotreatment by sludge reduction according to the present invention.

FIG. 4 is a schematic flow diagram for another embodiment of the method for sewage biotreatment according to the present invention, in which the terms have the same meanings as those of FIG. 3, and "sludge" represents a sludge feed from another source.

Figure 5:
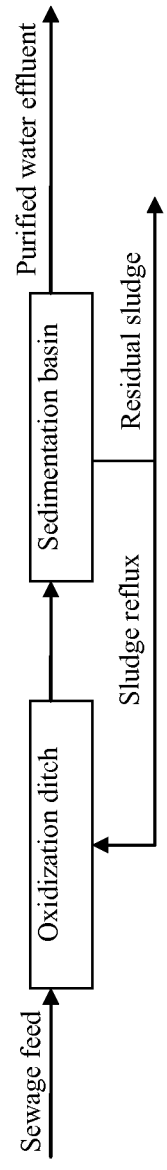
FIG. 5 is a schematic flow diagram of an oxidization ditch process for sewage treatment suitable for the method for sewage biotreatment according to the present invention.

FIG. 5 is a schematic flow diagram of an oxidization ditch process, which can be used as the sewage biotreatment process of the step (6), in which "sewage feed" can comprise the supernatant of the step (5) and/or a sewage feed, and "residual sludge" can be used as the sludge feed of the step (1).

Figure 6:
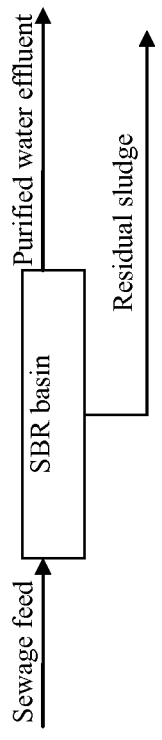
FIG. 6 is a schematic flow diagram of a SBR process for sewage treatment suitable for the method for sewage biotreatment according to the present invention.

FIG. 6 is a schematic flow diagram of a SBR process for sewage treatment which can be used as the sewage biotreatment of the step (6), in which the terms have the same meanings as those of FIG. 5.

FIG. 7 is a schematic flow diagram of an AB process for sewage treatment which can be used as the sewage biotreatment of the step (6), in which the terms have the same meanings as those of FIG. 5.

FIG. 8 is a schematic flow diagram of an A/O process for sewage treatment which can be used as the sewage biotreatment of the step (6), in which the terms have the same meanings as those of FIG. 5.

FIG. 9 is a schematic flow diagram of an A²/O process for sewage treatment which can be used as the sewage biotreatment of the step (6), in which the terms have the same meanings as those of FIG. 5.

Figure 10:
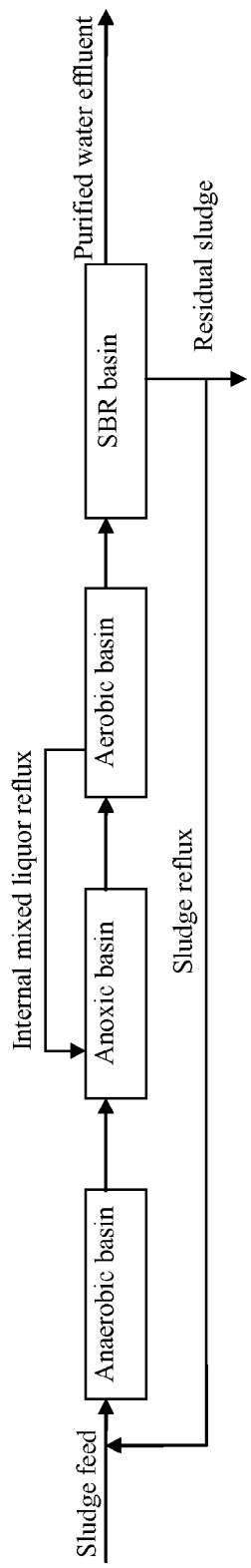
FIG. 10 is a schematic flow diagram of a MSBR process for sewage treatment suitable for the method for sewage biotreatment according to the present invention.

FIG. 10 is a schematic flow diagram of an MSBR process for sewage treatment which can be used as the sewage biotreatment of the step (6), in which the terms have the same meanings as those of FIG. 5.

In another aspect, the present invention further provides an apparatus for sludge treatment useful in the above method for sludge treatment, comprising: a first device disposed for mixing a sewage feed, a sludge feed and a first mixed liquor to obtain a second mixed liquor; a second device disposed for subjecting the second mixed liquor to an oxygen-supplying process to obtain a third mixed liquor; a third device disposed for subjecting the third mixed liquor to an anoxic process to obtain a fourth mixed liquor; a fourth device disposed for separating the fourth mixed liquor to obtain a supernatant and a first concentrated mixed liquor; a fifth device disposed for discharging the supernatant liquid; and a sixth device disposed for returning at least part of the first concentrated mixed liquor as the first mixed liquor to the first device so that the amount of sludge of the first concentrated mixed liquor that does not return to the first device is less than the amount of sludge of the sludge feed.

In some embodiments, the first device can be any construct or container suitable for mixing the sludge feed and the mixed liquor. The second device can by the same or different device from the first device. For example, the second device can be a device being in fluid communication with the first device and allowing the contact between the oxygen-containing gas such as air and the mixed liquor, for example, the second device can be an aeration basin with an aerating device. The third device can be the same device as the first device and the second device, which can perform anoxic treatment (in sequencing manner) when aeration is stopped; or the third device can be different from the second device, for example, a construct or container (such as sedimentation basin) capable of essentially preventing the contact between the oxygen-containing gas and the mixed liquor and running in a continuous or semi-continuous manner. The fourth device can be the same device as the first device, second device and third device, or the fourth device can be the same device as the third device only, in which the separation between the supernatant and the first concentrated mixed liquor can be performed by for example sedimentation without aeration and/or stirring and run in a sequencing manner; or the fourth device can be an independent device being in liquid communication with the third device and allowing the separation between the supernatant and the first concentrated mixed liquor, for example, an independent sedimentation basin, a centrifugal machine or a filter (running in a continuous or semi-continuous manner). The fifth device can be any device capable of removing the supernatant from the fourth device, such as drain outlet, drain pipe, drawer, etc. The sixth device can be the same device as the first device, second device, third device and fourth device (running in a sequencing manner); or an independent device capable of conveying at least part of the first concentrated mixed liquor from the fourth device to the first device, for example, a reflux pipe having a pump and a valve and being in liquid communication with the first device and the fourth device (running in a continuous or semi-continuous manner). The sixth device may optionally have a device such as a drain outlet or pipe with a valve to discharge the residual part of the first concentrated mixed liquor so that the amount of sludge of the first concentrated mixed liquor that does not return to the first device can be controlled being less than the amount of sludge of the sludge feed.

In some embodiments, the second device can be an aeration basin, oxidization ditch, fluidized bed, moving bed or membrane device, preferably an aeration basin, more preferably a plug flow aeration basin. The third device can preferably be a sedimentation basin, more preferably a plug flow sedimentation basin.

In some embodiments, the apparatus for sludge treatment can further comprise a device in fluid communication with the first device and capable of performing oxygen-supplying treatment of the sludge feed, such as a sludge pre-aeration device.

In some embodiments, the apparatus for sludge treatment can further comprise a deoxygenation device such as deoxygenation basin in liquid communication with the second device and the third device and capable of performing deoxygenation of the mixed liquor.

In some embodiments, the second device is disposed to have an oxygen-supplying treatment time of 0.1 to 0.2 hours, 0.2 to 0.3 hours, 0.3 to 0.4 hours, 0.4 to 0.5 hours, 0.5 to 0.6 hours, 0.6 to 0.8 hours, 0.8 to 1 hours, 1 to 1.2 hours, 1.2 to 1.5 hours, 1.5 to 1.8 hours, 1.8 to 2 hours, 2 to 2.2 hours, 2.2 to 2.5 hours, 2.5 to 3 hours or 3.5 to 4 hours, preferably 1.5 to 3 hours. For example, when the second device runs in a continuous manner, the working volume of the second device can be determined according to the flow rate of the second mixed liquor in the second device and using the desired oxygen-supplying treatment time as the retention time of the second mixed liquor.

In some embodiments, the third device is disposed to have an anoxic treatment time of 0.8 to 1 hours, 1 to 1.2 hours, 1.2 to 1.4 hours, 1.4 to 1.6 hours, 1.6 to 1.8 hours, 1.8 to 2 hours, 2 to 2.5 hours, 2.5 to 3 hours, 3 to 3.5 hours, 3.5 to 4 hours, 4 to 4.5 hours, 4.5 to 5 hours, 5 to 5.5 hours or 5.5 to 6 hours, preferably 3 to 4 hours. For example, when the third device runs in a continuous manner, the working volume of the third device can be determined according to the flow rate of the third mixed liquor in the third device and using the desired anoxic treatment time as the retention time of the third mixed liquor.

In some cases, the second device and the third device are disposed to have a ratio of the oxygen-supplying treatment time to the anoxic treatment time being 1:0.5 to 1:1, 1:1 to 1:1.5, 1:1.5 to 1:2, 1:2 to 1:2.5, 1:2.5 to 1:3, 1:3 to 1:3.6, 1:3.6 to 1:4, 1:4 to 1:4.5, 1:4.5 to 1:5, 1:5 to 1:5.5 or 1:5.5 to 1:6, preferably 1:1 to 1:3. For example, when the second device and the third device run in a continuous manner, the working volume ratio of the second device to the third device can be determined according to the ratio of the oxygen-supplying treatment time to the anoxic treatment time.

In some embodiments, the apparatus for sludge treatment can further comprise a recovery device for collecting and recovering gaseous phosphorus-containing compounds. For example, the recovery device can be in fluid communication with the second device and/or the third device to recover the gaseous phosphorus-containing compounds generated in the second device and/or third device. In some embodiments, the recovery device can be a freezing device, a combustion device, or an absorbing device such as absorbing tower, absorbing tank and so on having a solid or liquid absorbing agent.

In another aspect, the present invention further provides an apparatus for sewage biotreatment useful in the above method for sewage biotreatment, comprising: a first device disposed for mixing a sludge feed with a first mixed liquor to obtain a second mixed liquor; a second device disposed for subjecting the second mixed liquor to an oxygen-supplying process to obtain a third mixed liquor; a third device disposed for subjecting the third mixed liquor to an anoxic process to obtain a fourth mixed liquor; a fourth device disposed for separating the fourth mixed liquor to obtain a supernatant and a first concentrated mixed liquor; a fifth device disposed for discharging the supernatant liquid; a sixth device disposed for returning at least part of the first concentrated mixed liquor as the first mixed liquor to the first device so that the amount of sludge of the first concentrated mixed liquor that does not return to the first device is less than the amount of sludge of the sludge feed; a seventh device disposed for subjecting at least part of the supernatant from the fifth device to a sewage biotreatment process to obtain a second concentrated mixed liquor and a purified water effluent; an eighth device disposed for discharging the purified water effluent; a ninth device disposed for introducing a sewage feed into the first device so as to mix with the sludge feed and the first mixed liquor to obtain the second mixed liquor and/or into the seventh device so as to subject to the sewage biotreatment process together with the supernatant; and optionally a tenth device disposed for returning at least part of the second concentrated mixed liquor to the first device.

According to some embodiments of the apparatus for sewage biotreatment of the present invention, the seventh device is a device that performs sewage biotreatment by Wuhrmann process, A/O process, Bardenpho process, Phoredox process, $A^2$/O process, reversed $A^2$/O process, UCT process, MUCT process, VIP process, OWASA process, JHB process, TNCU process, Dephanox process, BCFS process, MSBR process, SBR process, AB process, oxidation ditch process, biomembrane process, moving bed process or a combination thereof.

In another aspect, the present invention further provides a system for sewage treatment by sludge reduction, comprising: a conventional sewage treatment apparatus and a sludge digestion apparatus, wherein the conventional sewage treatment apparatus has an inlet in connection with the sludge digestion apparatus and a residual sludge pipe in connection with the sludge digestion apparatus.

In one embodiment of the system for sewage treatment by sludge reduction according to the present invention, the sludge digestion apparatus comprises a high concentration sludge reaction apparatus.

In one embodiment of the system for sewage treatment by sludge reduction according to the present invention, the sludge digestion apparatus comprises an anaerobic sedimentation apparatus, wherein the anaerobic sedimentation apparatus comprises an inlet in connection with an outlet of the high concentration sludge reaction apparatus and a first sludge return pipe in connection with the high concentration sludge reaction apparatus.

In one embodiment of the system for sewage treatment by sludge reduction according to the present invention, the residual sludge pipe conveys total residual sludge to the sludge digestion apparatus.

In one embodiment of the system for sewage treatment by sludge reduction according to the present invention, the sludge digestion apparatus comprises an anaerobic sedimentation apparatus, wherein the anaerobic sedimentation apparatus comprises an inlet in connection with an outlet of the high concentration sludge reaction apparatus and a first sludge return pipe in connection with the high concentration sludge reaction apparatus, and the residual sludge pipe conveys total residual sludge to the sludge digestion apparatus.

In one embodiment of the system for sewage treatment by sludge reduction according to the present invention, the high concentration sludge reaction apparatus employs a sludge concentration of 4,000-20,000 mg/L, such as 6,000 mg/L, 8,000 mg/L, 10,000 mg/L, 12,000 mg/L, 14,000 mg/L, 15,000 mg/L, 16,000 mg/L or 18,000 mg/L.

In one embodiment of the system for sewage treatment by sludge reduction according to the present invention, the high concentration sludge reaction apparatus employs a hydraulic retention time of 1.5-3.0 h and an outlet concentration of dissolved-oxygen in a range of 1-1.5 mg/L, 1.5-2 mg/L, 2-2.5 mg/L or 2.5-3 mg/L.

In one embodiment of the system for sewage treatment by sludge reduction according to the present invention, the residual sludge pipe conveys 0.4Q to 0.7 Q of sludge to the high concentration sludge reaction apparatus.

In one embodiment of the system for sewage treatment by sludge reduction according to the present invention, a deoxygenation apparatus is provided between the high concentration sludge reaction apparatus and the anaerobic sedimentation apparatus.

In one embodiment of the system for sewage treatment by sludge reduction according to the present invention, the system further comprises a residual sludge aeration tank, wherein the residual sludge pipe of the conventional sewage treatment apparatus is in connection with the residual sludge aeration basin and the residual sludge aeration basin is in connection with the high concentration sludge reaction apparatus.

In one embodiment of the system for sewage treatment by sludge reduction according to the present invention, a pre-treatment apparatus is provided at an inlet of the sludge digestion apparatus, wherein the pre-treatment apparatus comprises at least one grid.

In one embodiment of the system for sewage treatment by sludge reduction according to the present invention, the pre-treatment apparatus comprises two grids.

In one embodiment of the system for sewage treatment by sludge reduction according to the present invention, the conventional sewage treatment apparatus comprises an aerobic reaction apparatus and a sedimentation apparatus connected in series, wherein the sedimentation apparatus comprises a second sludge return pipe and a residual sludge pipe, and the second sludge return pipe is in connection with an anaerobic reaction apparatus.

In one embodiment of the system for sewage treatment by sludge reduction according to the present invention, the aerobic reaction apparatus is an aeration basin or an oxidation ditch.

In one embodiment of the system for sewage treatment by sludge reduction according to the present invention, the conventional sewage treatment apparatus comprises an anaerobic reaction apparatus, an anoxic reaction apparatus, an aerobic reaction apparatus and a sedimentation apparatus connected in series, wherein the sedimentation apparatus comprises a third sludge return pipe and a residual sludge pipe, and the third sludge return pipe is in connection with the anoxic reaction apparatus.

In one embodiment of the system for sewage treatment by sludge reduction according to the present invention, the sedimentation apparatus is a SBR basin or a sedimentation tank.

In one embodiment of the system for sewage treatment by sludge reduction according to the present invention, the SBR basin has a sludge concentration of 2,000-4,000 mg/L, a dissolved-oxygen concentration of 2-4 mg/L, and a static sedimentation time of 1-1.5 h within one week and a constant water level drainage time of 1.5-2.5 h.

In one embodiment of the system for sewage treatment by sludge reduction according to the present invention, the second sludge return pipe is in connection with the anaerobic reaction apparatus to convey 0.5-1 Q of sludge to the anaerobic reaction apparatus.

In one embodiment of the system for sewage treatment by sludge reduction according to the present invention, the third sludge return pipe is in connection with the anaerobic reaction apparatus to convey 0.5-1 Q of sludge to the anaerobic reaction apparatus.

In another aspect, the present invention provides a method for sewage treatment by sludge reduction, comprising:

a) Subjecting a mixture of sewage and sludge to a sludge digestion reaction;

b) Subjecting the sewage after the sludge digestion reaction to a conventional sewage treatment; and c) Discharging the sewage after the conventional sewage treatment, and returning and subjecting a residual sludge generated during the conventional sewage treatment to the sludge digestion reaction.

In one embodiment of the method for sewage treatment by sludge reduction according to the present invention, the sludge digestion reaction in step a) comprises subjecting the mixture of sewage and sludge to a high concentration sludge reaction.

In one embodiment of the method for sewage treatment by sludge reduction according to the present invention, the sludge digestion reaction in step a) comprises subjecting the mixture of sewage and sludge after the high concentration sludge reaction to an anaerobic sedimentation, and returning and subjecting a sludge of the anaerobic sedimentation to the high concentration sludge reaction.

In one embodiment of the method for sewage treatment by sludge reduction according to the present invention, all of the residual sludge is returned.

In one embodiment of the method for sewage treatment by sludge reduction according to the present invention, the sludge digestion reaction in step a) comprises subjecting the mixture of sewage and sludge after the high concentration sludge reaction to an anaerobic sedimentation, and returning and subjecting sludge of the anaerobic sedimentation to the high concentration sludge reaction, wherein all of the sludge is returned.

In one embodiment of the method for sewage treatment by sludge reduction according to the present invention, the high concentration sludge reaction employs a sludge concentration of 4,000-20,000 mg/L, such as 6,000 mg/L, 8,000 mg/L, 10,000 mg/L, 12,000 mg/L, 14,000 mg/L, 15,000 mg/L, 16,000 mg/L or 18,000 mg/L.

In one embodiment of the method for sewage treatment by sludge reduction according to the present invention, the high concentration sludge reaction employs a hydraulic retention time of 1.5-3.0 h and an outlet dissolved-oxygen concentration of 1-1.5 mg/L, 1.5-2 mg/L, 2-2.5 mg/L or 2.5-3 mg/L.

In one embodiment of the method for sewage treatment by sludge reduction according to the present invention, the sludge of the anaerobic sedimentation is returned and subjected to the high concentration sludge reaction in a reflux rate of 0.4-0.7 Q.

In one embodiment of the method for sewage treatment by sludge reduction according to the present invention, the mixture of sewage and sludge after the high concentration sludge reaction is subjected to a deoxygenation prior to the anaerobic sedimentation.

In one embodiment of the method for sewage treatment by sludge reduction according to the present invention, the residual sludge is subjected to sludge aeration prior to the high concentration sludge reaction.

In one embodiment of the method for sewage treatment by sludge reduction according to the present invention, the sludge aeration employs a dissolved-oxygen concentration of 0.2-0.9 mg/L.

In one embodiment of the method for sewage treatment by sludge reduction according to the present invention, the sewage is subjected to a pre-treatment for removing impurities prior to the sludge digestion reaction.

In one embodiment of the method for sewage treatment by sludge reduction according to the present invention, the conventional sewage treatment in step b) comprises an aerobic reaction and a sedimentation, wherein the sewage after the aerobic reaction is discharged after the sedimentation, and the generated sludge is returned and subjected to the anaerobic reaction.

In one embodiment of the method for sewage treatment by sludge reduction according to the present invention, the conventional sewage treatment in step b) comprises an anaerobic reaction, an anoxic reaction, an aerobic reaction and a sedimentation, wherein the sewage after the aerobic reaction is discharged after the sedimentation, and the generated sludge is returned and subjected to the anaerobic reaction.

In one embodiment of the method for sewage treatment by sludge reduction according to the present invention, the generated sludge is returned and subjected to the anaerobic reaction in a reflux rate of 0.5-1 Q.

In one embodiment of the method for sewage treatment by sludge reduction according to the present invention, the sedimentation employs a SBR process.

In one embodiment of the method for sewage treatment by sludge reduction according to the present invention, the SBR process employs a sludge concentration of 2,000-4,000 mg/L, a dissolved-oxygen concentration of 2-4 mg/L, a static sedimentation time of 1-1.5 h within one week and a constant water level drainage time of 1.5-2.5 h.

In further another aspect, the present invention provides a system for sewage treatment by sludge reduction, comprising: a high concentration sludge reaction apparatus, an anaerobic sedimentation apparatus and a conventional sewage treatment apparatus connected in series, wherein the anaerobic sedimentation apparatus has a sludge return pipe in connection with the high concentration sludge reaction apparatus, the conventional sewage treatment apparatus has a residual sludge pipe in connection with the high concentration sludge reaction apparatus.

In one embodiment of the system for sewage treatment by sludge reduction according to the present invention, the high concentration sludge reaction apparatus employs a sludge concentration of 4,000-20,000 mg/L, such as 6,000 mg/L, 8,000 mg/L, 10,000 mg/L, 12,000 mg/L, 14,000 mg/L, 15,000 mg/L, 16,000 mg/L or 18,000 mg/L.

Figure 11:
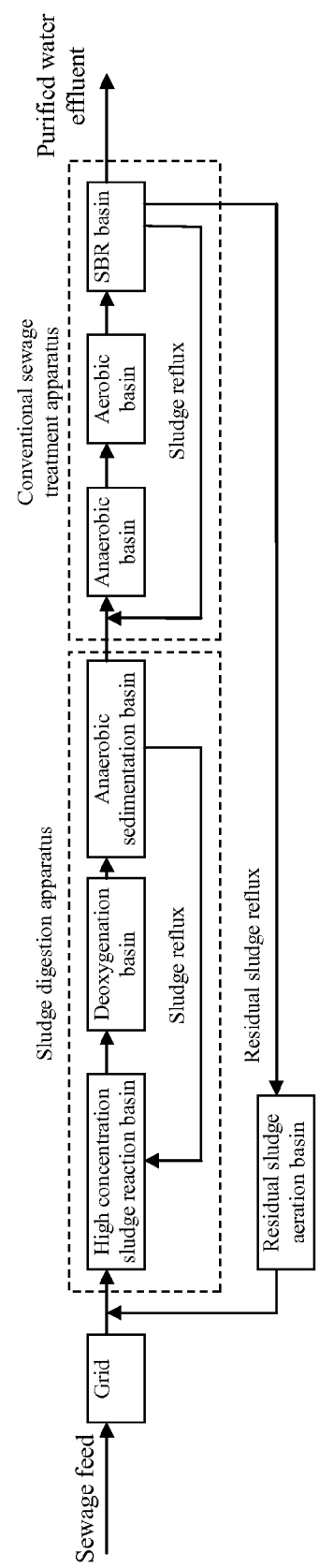
FIG. 11 is a schematic flow diagram of an embodiment of the method for sewage biotreatment according to the present invention.
Figure 12:
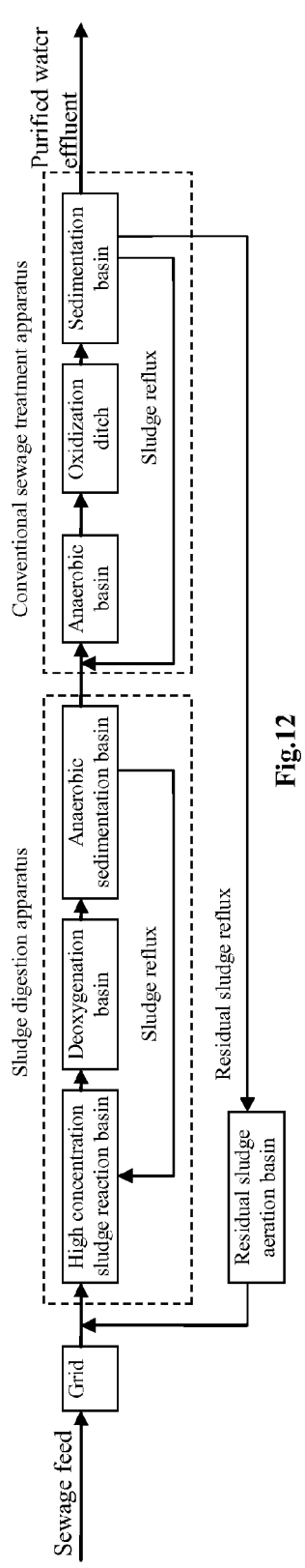
FIG. 12 is a schematic flow diagram of an embodiment of the method for sewage biotreatment according to the present invention.
Figure 13:
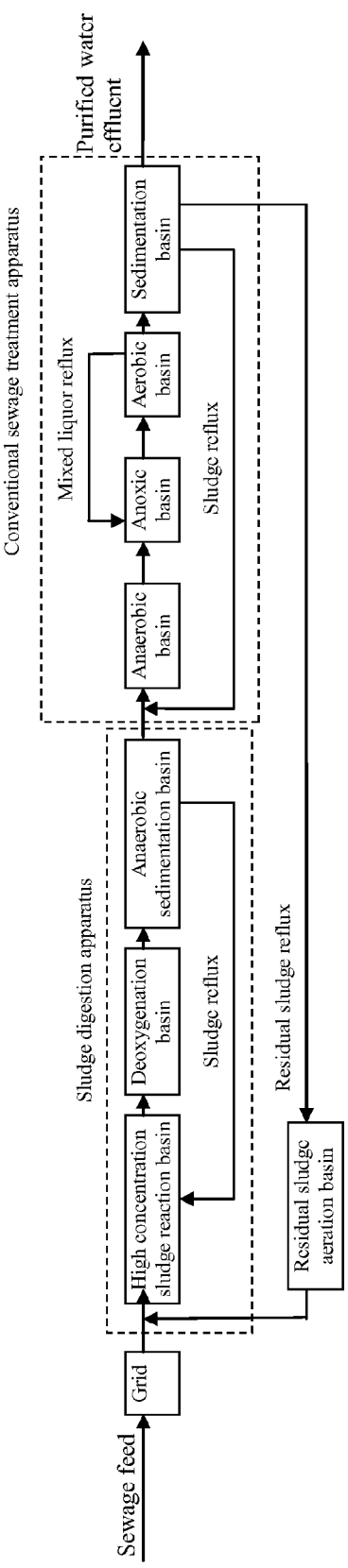
FIG. 13 is a schematic flow diagram of an embodiment of the method for sewage biotreatment according to the present invention.

In some embodiments, the system for sewage treatment by sludge reduction according to the present invention can be an apparatus having a flow diagram as shown in FIG. 11, 12 or 13, in which the sludge digestion apparatus is in connection with a high concentration sludge reaction basin, a deoxygenation basin and an anaerobic sedimentation basin.

In some embodiments, a pre-treatment apparatus is provided before the sludge digestion apparatus, wherein the pre-treatment apparatus comprises at least one grid. The grid is usually used as the first treatment apparatus of sewage treatment plant. Particularly, the grid may comprise two grids, wherein the first grid is used to remove larger impurities from sewage and then the second grid is used to further remove smaller impurities from sewage, the net interval of stripes of the first grid is greater than that of the second grid, for example, the first grid can be a coarse grid and have a net interval of stripes of 20 mm and an installation angle of 60 degree, while the second grid can be a fine grid and have a net interval of stripes of 6 mm and an installation angle of 60 degree.

In some embodiments, the high concentration sludge reaction apparatus is a high concentration sludge reaction tank, wherein the sewage after the pre-treatment, the sludge returned from the anaerobic sedimentation apparatus and the residual sludge returned from the sedimentation apparatus at the end of the system are subjected to an aeration mixing in the high concentration sludge reaction tank, and the high concentration sludge reaction basin is a rectangular plug flow type tank. A residual sludge aeration basin is provided between the sedimentation apparatus and the high concentration sludge reaction apparatus, wherein the residual sludge aeration basin is connected to the sedimentation apparatus and the high concentration sludge reaction apparatus through a residual sludge pipe respectively, the returned residual sludge flows into the residual sludge aeration tank, the sewage and the sludge returned from the anaerobic sedimentation apparatus directly flow into the high concentration sludge reaction tank, the residual sludge after aeration then flows into the high concentration sludge reaction basin and mixes with a mixture of sewage and sludge thoroughly.

In particular, the high concentration sludge reaction basin is operated at a relatively high sludge concentration in an anaerobic/aerobic manner with a short hydraulic retention time. In the present invention, there is a sludge cycle between the high concentration sludge reaction basin and the subsequent anaerobic sedimentation apparatus, so that the sludge from the anaerobic sedimentation apparatus can be returned to the high concentration sludge reaction tank. Since the quality and amount of sewage of different time periods may be uneven and fluctuate vigorously, the high concentration sludge reaction basin may also provide a buffering function to reduce effects of shock load on the bio-chemical treatment.

In particular, the aerobic sedimentation apparatus is an aerobic sedimentation tank. The sludge in the aerobic sedimentation basin is returned to the high concentration sludge reaction basin and subjected to reaction together with sewage and residual sludge. A non-clogging sludge pump can be employed to realize the cycle of sludge. In one embodiment of the present invention, there is a deoxygenation apparatus between the high concentration sludge reaction apparatus and the anaerobic sedimentation apparatus, the mixture of sewage and sludge flows into the aerobic sedimentation basin after deoxygenation so as to prevent dissolved-oxygen from being introduced into the aerobic sedimentation basin and influencing the anaerobic reaction.

An aerobic reaction apparatus, i.e. an aerobic basin is then connected to the aerobic sedimentation tank. The aerobic basin is preferably of a plug flow type with a baffle disposed therein, or in complete mixing type, wherein the sludge from the sedimentation apparatus at the end of the system is returned to the anaerobic basin and mixed with the sewage.

The conventional sewage treatment apparatus comprises an aerobic reaction apparatus and a sedimentation apparatus connected in series, wherein the aerobic reaction apparatus is an aerobic basin or other conventional aerobic reaction apparatus such as an oxidation ditch and is connected in series to the anaerobic tank. The anaerobic sedimentation tank, the anaerobic basin and the aerobic basin form $A^2/O$ (Anaeroxic-Anoxic-Oxic) biological denitrogenation process. In the aerobic tank, an aeration apparatus, such as three-lobe Root's blower and He280 type dynamic diffusion rotation mixing aeration apparatus, is provided.

The sedimentation apparatus, which has sedimentation function and is provided with a sludge return pipe and a residual pipe, can be a SBR (Sequencing Batch Reactor Activated Sludge Process) basin or a sedimentation tank. SBR is a batch activated sludge approach, in which sewage immediately adjacent to the bottom of aerobic basin flows into the SBR basin via a water tunnel, when the sewage penetrates a sludge layer in the SBR basin and is discharged, the sludge layer plays a role of filtration and interception thereby lowering the content of impurities in the discharged water and rendering the quality of the discharged water superior to that of water discharged from ordinary secondary sedimentation tank. Air weir may also be employed in the present invention to control the water discharge so as to prevent impurities from entering into the weir for discharging water thereby effectively controlling the impurities in the discharged water.

A sludge return pipe is provided between the SBR basin and the anaerobic tank. The anaerobic tank, the aerobic basin and the SBR basin forms an OSA (Oxic-Settling-Anaerobic) process, i.e., an aerobic-sedimentation-anaerobic process, in which an anaerobic stage is added in conventional activated sludge process so that micro-organisms alternatively enter into aerobic environment and anaerobic environment so that the ATP obtained by bacterial during aerobic stage can not be used to synthesize new cells immediately, but be consumed in anaerobic stage as energy for maintaining the life activities of cells, the decomposition and anabolism of the micro-organisms are relatively separated rather than closely coupled under conventional condition thereby achieving the effect of reducing sludge. The OSA process is capable of reducing the amount of the generated sludge, improving the sedimentation properties of sludge and enhancing the capacity of removing ammonia nitrogen.

The SBR basin and the high concentration sludge reaction basin are connected with a residual sludge pipe, and the generated residual sludge is not discharged but returned to the high concentration sludge reaction basin at the forepart of the system.

The SBR basin comprises two sets operated in parallel so that the SBR basin can be operated at constant water level and discharge water in a continuous and cycle manner. The system is arranged such that all apparatuses, from the high sludge loading basin to the SBR tank, are connected in series in order of height decreasing, thereby the sewage can self-flow upon gravity to reduce the number of times for lifting the sewage and save electric energy. Moreover, a combined integrate structure is employed for each treatment unit, and the tanks can realize plug flow in series, thus a great amount of pipes and instruments among treatment units can be omitted; in the meanwhile, the sewage flow in the reaction apparatus shows a overall plug flow but in a complex flow state of completely mixing in different regions, such that the treatment effect can be ensured.

In one embodiment of the present invention, the sludge digestion reaction comprises subjecting the mixture of sewage and sludge to a high concentration sludge reaction, wherein the high concentration sludge reaction has a hydraulic retention time of 1.5-3.0 h, such as 2 h or 2.5 h, an outlet dissolved oxygen concentration of 1-1.5 mg/L, 1.5-2 mg/L, 2-2.5 mg/L or 2.5-3 mg/L, and a sludge concentration of 4,000-20,000 mg/L, such as 4,000 mg/L, 6,000 mg/L, 8,000 mg/L, 10,000 mg/L, 12,000 mg/L, 14,000 mg/L, 15,000 mg/L, 16,000 mg/L, 18,000 mg/L or 20,000 mg/L.

In one embodiment of the present invention, the sludge digestion reaction further comprises an anaerobic sedimentation, i.e., subjecting the mixture of sewage and sludge after high concentration sludge reaction to an anaerobic sedimentation, and returning the sludge after the anaerobic sedimentation to the high concentration sludge reaction in a reflux rate of 0.4-0.7 Q, such as 0.5 Q or 0.6 Q.

The mixture of sludge and the pre-treated sewage is subjected to a sludge digestion reaction, in particular, the mixture enters into the high concentration sludge reaction basin to undergo aeration, in the meanwhile, the sewage is sufficiently mixed with the residual sludge returned from the SBR basin and the sludge returned from the anaerobic sedimentation tank, preferably, the residual sludge is firstly subjected to aeration in the residual sludge aeration tank, then enters into the high concentration sludge reaction tank, alternatively the residual sludge may directly enter into the high concentration sludge reaction basin without aeration, the sludge returned from the anaerobic basin may directly enter into the high concentration sludge reaction tank, and all residual sludge may preferably return to the high concentration sludge reaction tank, thereby realizing zero discharge. The concentration of dissolved oxygen in the residual sludge aeration basin is in the range of 0.2-0.9 mg/L, such as 0.3 mg/L, 0.4 mg/L, 0.5 mg/L, 0.6 mg/L, 0.7 mg/L, 0.8 mg/L. After the sludge is mixed with the sewage, the organic substances in the sewage are subjected to decomposition and nitration, wherein the hydraulic retention time in the high concentration sludge reaction basin is in the range of 1.5-3.0 h, such as 2 h or 2.5 h, the concentration of the sludge is in the range of 4,000-20,000 mg/L, such as 4,000 mg/L, 6,000 mg/L, 8,000 mg/L, 10,000 mg/L, 12,000 mg/L, 14,000 mg/L, 15,000 mg/L, 16,000 mg/L, 18,000 mg/L or 20,000 mg/L. There is an independent sludge returning, and the sludge returns from the anaerobic sedimentation basin to the high concentration sludge reaction basin and has a reflux rate of 0.4-0.7 Q, such as 0.5 Q or 0.6 Q. Thus, the sludge concentration is relatively high, for example, is higher than that of conventional activated sludge treatment process by 3-5 times, which effectively enhances the capacity of the system against shock load. Furthermore, the high concentration of activated sludge can decompose effectively the organic substance and provide an excellent buffering effect against the shock of water quality, water quantity, pH value and toxic substance, and make the treatment effect in posterior stage of the system more stable. Blowing aeration is employed, and the outlet dissolved oxygen concentration is in the range of 1-1.5 mg/L, 1.5-2 mg/L, 2-2.5 mg/L or 2.5-3 mg/L.

The sewage flows out the high concentration sludge reaction tank, is subjected to deoxygenation, and then enters into the anaerobic sedimentation tank. In the meanwhile, the sludge precipitated in the anaerobic sedimentation basin and the residual sludge produced in the conventional sewage treatment return to the high concentration sludge reaction tank, wherein the sludge returns from the anaerobic sedimentation basin in a continuous and cycle manner. The mixture sludge in the high concentration sludge reaction basin undergoes aerobic process and anaerobic process alternatively all the time, thus neither aerobic microorganisms nor the anaerobic microorganisms can be of dominative, and therefore the hydrolysis process of the residual sludge is completed to the maximum extent.

Macromolecular organic substances can be bio-degraded into small molecular organic substances by hydrolysis, and the small molecular organic substances produced through hydrolysis (rdcod bio-degradation) can be further converted under strict anaerobic conditions into VFAs (volatile fatty acids) as "potential" internal carbon source, i.e., organic carbon, produced by the sludge hydrolysis. The organic carbon can increase the efficiency of ammonia nitrogen removal significantly and reduce external carbon source. It's a common phenomenon for urban sewage treatment plants that the lack of carbon source usually leads to a poor effect of removing ammonia nitrogen from urban sewage. When the carbon source is abundant, energy leakage occurs, which is so called the uncoupling phenomenon, rendering low utilization of substrate. The retention time of sludge becomes infinite due to the sludge returning, thus inert substances can be decomposed by uncoupling effect. The decomposition of inorganic substances in the residual sludge is achieved by chemoautotrophic bacteria and the decomposition of organic substances in the residual sludge is achieved by chemoheterotrophic bacteria, so that the accumulation of inert substance will not occurs in the system, thereby realizing the zero discharge of residual sludge of urban sewage treatment plant. Experiments shows that the sludge returned from the anaerobic sedimentation basin and the residual sludge produced in the conventional sewage treatment plant are digested massively to achieve the balance between growth and digestion, so that both the anaerobic sedimentation basin and the SBR basin do not discharge sludge, the reaction is stable, and the zero discharge of sludge is realized.

The sewage flows from the anaerobic sedimentation basin and enters into the anaerobic tank, and the anaerobic sedimentation tank, the anaerobic basin and the aerobic basin construct the $A^2/O$ process. The sewage and the sludge returned from the conventional sewage treatment are mixed in the anaerobic basin to remove ammonia nitrogen sufficiently, and then the sludge together with the sewage enter into the aerobic tank, the organic substances in the sewage are further absorbed, oxidized and decomposed through the anabolism of the aerobic bacteria, and nitration may occur.

Finally, the sewage is subjected to sedimentation in the sedimentation apparatus and discharged. The sedimentation apparatus is preferably a SBR tank. The sludge in the SBR basin returns to the anaerobic basin in a reflux rate of 0.5-1Q, while the residual sludge returns to the high concentration sludge reaction tank. Because the organic substances in the sewage entering into the SBR basin have been effectively decomposed, the water quality is stable. The decomposition of the organic substances in the sewage would be more complete after aeration in the SBR tank. In addition, a clear and high-density sludge layer may form in the SBR basin during periodical static sedimentation, and plays a role of sludge filtration to improve water quality and denitrification. The SBR basin employs a sludge concentration of 4,000-20,000 mg/L, a dissolved oxygen concentration of 2-4 mg/L, a static sedimentation time of 1-1.5 h, preferably 1 h, within per one period in the SBR basin (during the static sedimentation, the sewage is subjected to denitrification and sedimentation in the tank), and a constant water level drainage time of 1.5-2.5 h, preferably 2 h.

The anaerobic tank, the aerobic basin and the SBR basin constitute an OSA process, in which the sludge returns to the anaerobic tank, thereby effectively inhibiting filamentous bacteria, preventing sludge expansion, improving sewage sedimentation properties, and reducing the amount of the produced sludge. As for aerobic micro-organisms, the energy required to form ATP is from the oxidization process of external organic substance matrix. When the aerobic micro-organisms are under anaerobic condition, the decomposition of organic substances is completely different from that of the aerobic decomposition, and the released energy decreases significantly. The micro-organisms per se do not have enough energy for their growth and have to employ the ATP stored in their body as energy supply for their normal physiological activities. Thus, the ATP stored in cells of the micro-organisms of this stage is consumed in a great amount, so that the amount of the sludge has a tendency of decreasing. If biosynthesis is carried out at this time, necessary energy storing has to be carried out for the micro-organisms. If ATP is not stored sufficiently in the cells, the synthesis of the cells itself would not proceed continuously. Thus, when the micro-organisms consume a great amount of ATP and re-enter into the aerobic basin with abundant nutrition, the micro-organisms may have to satisfy their energy requirement only through the endogenous digestion by the dissimilation of cells. Such anaerobic/aerobic alternation enhances the dissimilation, increases the energy uncoupling and reduces the sludge production. The anaerobic basin also has the function of hydrolytic acidification and increases the biodegradability of sewage.

Hence, the apparatus for sludge treatment according to the present invention is particularly favorable to reforming various existing activated sludge sewage treatment apparatus. For example, the apparatus for sludge treatment of the present invention can be built close to an existing sewage treatment apparatus, so that the residual sludge of the existing sewage treatment apparatus is used as the sludge feed of the apparatus for sludge treatment, and the supernatant discharged from the apparatus for sludge treatment is used as a part of sewage feed and introduced into the existing sewage treatment apparatus. Hence, the apparatus for sludge treatment of the present invention can essentially eliminate all of the residual sludge discharged from the existing sewage treatment apparatus, so that the reformed apparatus will not discharge sludge. In the meantime, the supernatant containing a relatively large amount of biodegradable organics will advantageously facilitate the removal of nitrogen and phosphorus that may not be removed by the existing apparatus when carbon source is not sufficient. This is particularly favorable to the treatment of domestic sewage from cities that usually has a relatively low COD. If the sewage feed is firstly introduced into the apparatus for sludge treatment of the present invention, the high concentration sludge in the new apparatus for sludge treatment can digest and degrade contaminants in the sewage feed rapidly and efficiently, thereby further improving the efficiency and effects of sewage treatment.

EXAMPLE 1

In the example, t represents ton; DS represents dry sludge; $m^3$ represents cubic meter; d represents day; and COD represents chemical oxygen demand.

Apparatus and Design Parameters:

According to the method for sludge treatment and the method for sewage treatment of the present invention, a sewage treatment plant having a sewage treatment ability of 20,000 $m^3$/d was built, which has a flow diagram as shown in FIG. 11, in which the high concentration sludge reaction basin (used for oxygen-supplying treatment), the degassing basin and the anaerobic sedimentation basin (used for anoxic treatment) form the sludge digestion apparatus (i.e., the apparatus for sludge treatment according to the present invention), and the anaerobic basin, aerobic basin and SBR basin form the conventional sewage treatment apparatus (i.e., the sewage biotreatment device of the apparatus for sewage biotreatment according to the present invention). The sludge from the anaerobic sedimentation basin of the sludge digestion apparatus (i.e., the first concentrated mixed liquor, which is totally used as the first mixed liquor), the residual sludge (i.e., the second concentrated mixed liquor, which is totally used as the sludge feed) from the SBR basin of the conventional sewage treatment apparatus and the sewage feed after grid treatment are mixed to form the second mixed liquor. The second mixed liquor is subjected to aeration treatment in the high concentration sludge reaction basin to obtain the third mixed liquor. The third mixed liquor enters into the degassing basin and is subjected to deoxygenation, then enters the anaerobic sedimentation basin and is subjected to sedimentation treatment (anoxic treatment) in the anaerobic sedimentation basin to obtain the fourth mixed liquor that is simultaneously separated into the supernatant as upper layer and the first concentrated mixed liquor as lower layer. The first concentrated mixed liquor is used as the sludge reflux and returns to the high concentration sludge reaction basin via the sludge reflux pipe. The supernatant enters the conventional sewage treatment apparatus, passes the anaerobic basin, aerobic basin and SBR basin to obtain the purified water effluent and the residual sludge (i.e., the second concentrated mixed liquor). The residual sludge is subjected to aeration treatment in the residual sludge aeration basin and then returns to the high concentration sludge reaction basin.

The running of this sewage treatment plant from July 2008 to now shows that the sludge yield is maintained at a level of about 0 tDS/(10,000 $m^3$ sewage.d), and thus realizes zero discharge of sludge. As a comparison, a sewage treatment plant of an adjacent city that treats similar sewage usually gives a sludge yield of 1.04 to 1.64 tDS/(10,000 $m^3$ sewage·day), and an average value of 1.25 tDS/(10,000 $m^3$ sewage·d).

The quality of the purified water effluent is shown in Table 1 which gives data about the total amount, COD and ammonia nitrogen of the purified water effluent from September 2008 to May 2009, in which the average aeration time of the high concentration sludge reaction basin was controlled at 0.25 to 3.5 hours, the sedimentation time of the anaerobic sedimentation basin was controlled at 1 to 5 hours, and the ratio of aeration time to sedimentation time was controlled at 1:0.8 to 1:5. During the whole test period, this sewage treatment apparatus did not discharge any sludge.

TABLE 1

The total amount, average COD and average ammonia nitrogen of the purified water effluent from September 2008 to May 2009

| Time (Y/M) | Total amount of the purified water effluent ($m^3$/M) | Average COD (mg/L) | Average ammonia nitrogen (mg/L) |
| --- | --- | --- | --- |
| 2008/9 | 453043 | 40.10 | 3.31 |
| 2008/10 | 321173 | 41.06 | 3.03 |
| 2008/11 | 375003 | 37.16 | 5.24 |
| 2008/12 | 384116 | 37.39 | 6.38 |
| 2009/1 | 331662 | 37.48 | 6.49 |
| 2009/2 | 377502 | 38.13 | 7.16 |
| 2009/3 | 301817 | 42.21 | 5.49 |
| 2009/4 | 288624 | 38.67 | 1.94 |
| 2009/5 | 72594 | 40.01 | 0.38 |

In the "Standards for discharge of contaminants from sewage treatment plants in cities" (GB18918-2002), the maximum COD is 60 mg/L for the Class I(B), and the maximum ammonia nitrogen is 8 mg/L (>12° C.) and 15 mg/L (≤12° C.) for the Class I(B).

It can be seen from Table 1 that the COD and ammonia nitrogen of the water effluent obtained by the sewage treatment system according to the present invention meet the Class I(B) standards of GB18918-2002 whether at high or low temperature.

The test from September to May 2009 further shows that the sludge concentration in the high sludge concentration reaction basin always kept at a relatively high level (see: Table 2).

TABLE 2

Monthly average sludge concentration of the second mixed liquor in the high concentration sludge reaction basin during the test from September 2008 to May 2009

| Time (Y/M) | Monthly average sludge concentration in the high concentration sludge reaction basin (mg/L) |
|---|---|
| 2008/9 | 6890 |
| 2008/10 | 8120 |
| 2008/11 | 14080 |
| 2008/12 | 17230 |
| 2009/1 | 18230 |
| 2009/2 | 15980 |
| 2009/3 | 13060 |
| 2009/4 | 12240 |
| 2009/5 | 7850 |

In order to further observe the operation of the sludge digestion apparatus (i.e., the apparatus for sludge treatment), the COD, ammonia nitrogen (AN) and total phosphorus (TP) of the sewage feed, the water phase of the second mixed liquor and the supernatant were measured (see: Table 3).

TABLE 3

The data of COD, ammonia nitrogen and total phosphorus of the sewage feed, the water phase of the second mixed liquor and the supernatant measured at different time (mg/L)

| Time (Y/M/D) | Sewage feed | | | Water phase of the second mixed liquor | | | Supernatant | | |
|---|---|---|---|---|---|---|---|---|---|
| | COD | AN | TP | COD | AN | TP | COD | AN | TP |
| 2010/4/11 | 618.30 | 89.93 | 13.20 | 509.97 | 128.31 | 23.89 | 350.02 | 126.99 | 15.57 |
| 2010/4/12 | 688 | 70.22 | 10.21 | 391 | 85.96 | 13.65 | 348 | 85.07 | 8.56 |
| 2010/4/13 | 254 | 38.6 | 4.2 | 275 | 78.9 | 12.5 | 86 | 52.9 | 5.02 |
| 2010/4/14 | 314.82 | 66.25 | 3.41 | 154.48 | 94.78 | 6.22 | 109.50 | 78.31 | 3.54 |
| 2010/4/18 | 361.34 | 57.87 | 18.95 | 346.11 | 42.87 | 18.95 | 113.29 | 48.90 | 11.12 |

It can be seen from Table 3 that the COD, ammonia nitrogen and total phosphorus of the supernatant from the sludge digestion apparatus sewage feed are remarkably lower than those of the water phase of the second mixed liquor. In the sludge digestion apparatus of the Example 1, the sewage feed and the sludge feed formed its net input, and there was no solid or liquid output except the supernatant, and there was no sludge accumulation in the sludge digestion apparatus. Hence, the organisms and solids from the sewage feed and the sludge feed, expect those discharged with the supernatant, were all digested and decomposed, thereby achieving the reduction of residual sludge. Without being limited to any theory, it is considered that the digested and decomposed organisms and solids were converted into gaseous substances and escaped out of the sludge digestion apparatus. For the whole sewage apparatus, the contaminants in the sewage feed (largely expressed as COD, ammonia nitrogen and total phosphorus) were converted into gaseous substances and escaped out of the sewage apparatus, so that when the purified water effluent was obtained, no other solid or liquid substances was discharged.

EXAMPLE 2

According to the method for sludge treatment and the method for sewage treatment of the present invention, an existing sewage treatment plant that had been run in MSBR (i.e., $A^2/O$ followed with SBR) process was reformed. The reformed sewage treatment plant has a sewage treatment ability of 20,000 $m^3$/d, and its flow diagram can also be represented by FIG. 11, in which the parameters are the same as those of Example 1.

The reformed sewage treatment plant has been run for more than one year, and its sludge yield kept at about 0 tDS/(10,000 $m^3$ sewage·d), so that the zero discharge of sludge is also achieved. In addition, it has an average COD of 24.3 mg/L in winter and 27.56 mg/L in summer, and an average ammonia nitrogen content of 8.85 mg/L in winter and 4.07 mg/L in summer, which all meet the Class I(B) standards of GB18918-2002.

In both the new sewage treatment plant and the reformed sewage treatment plant according to the method for sludge treatment of the present invention, the high concentration sludge reaction, the anaerobic sedimentation and the conventional sewage treatment process are combined together for sewage treatment, and the results indicate the advantages including the improved sludge sedimentation property, the inhibition of sludge bulking, the digestion of residual sludge, and the zero discharge of sludge.

The system and method for sewage treatment by sludge reduction according to the present invention are illustrated above. The number of steps of the method as described in the description and the claims do not represent the sequence of the steps unless the sequence is pointed out or can be exclusively determined. The examples for demonstrating the principle and embodiments of the present invention are intended to understand the method of the present invention. It should be noted that without departing from the principle of the present invention, any improvements and modifications to the present invention can also be made and fall within the scope of the claims.

What is claimed is:
1. A method for sewage biotreatment, comprising:
    (1) Mixing a sludge feed from a sewage biotreatment process with a first mixed liquor to obtain a second mixed liquor;
    (2) Subjecting the second mixed liquor to an oxygen-supplying process to obtain a third mixed liquor;
    (3) Subjecting the third mixed liquor to an anoxic process to obtain a fourth mixed liquor;
    (4) Separating the fourth mixed liquor to obtain a supernatant liquid and a first concentrated mixed liquor;
    (5) Discharging the supernatant liquid, and returning at least a part of the first concentrated mixed liquor as the first mixed liquor to the step (1), wherein the amount of sludge of the first concentrated mixed liquor that does not return to the step (1) is less than the amount of sludge of the sludge feed;

(6) Subjecting at least a part of the supernatant liquid from the step (5) and optionally a part of sewage feed to the sewage biotreatment process to obtain a second concentrated mixed liquor and a purified water effluent; and (7) Discharging the purified water effluent, and optionally returning at least a part of the second concentrated mixed liquor from the step (6) as the sludge feed to the step (1);

wherein a sewage feed is introduced to the step (1) and mixed with the sludge feed and the first mixed liquor to obtain the second mixed liquor and/or introduced to the step (6) and subjected to the sewage biotreatment process together with the at least part of supernatant from the step (5).

2. The method for sewage biotreatment according to claim 1, wherein in the step (5), at least 60% of the first concentrated mixed liquor returns to the step (1) and is used as the first mixed liquor, and optionally the first concentrated mixed liquor that does not return to the step (1) is discharged.

3. The method for sewage biotreatment according to claim 2, wherein in the step (2), the oxygen-supplying process has an oxygen-supplying treatment time of 0.1 to 4 hours.

4. The method for sewage biotreatment according to claim 1, wherein in the step (3), the anoxic process has an anoxic treatment time of 0.8 to 6 hours.

5. The method for sewage biotreatment according to claim 1, wherein the ratio of the oxygen-supplying treatment time to the anoxic treatment time is 1:0.5 to 1:6.

6. The method for sewage biotreatment according to claim 1, wherein in the step (2), the oxygen-supplying process is performed in a manner of intermittent aeration or continuous aeration.

7. The method for sewage biotreatment according to claim 1, wherein the third mixed liquor has a dissolved oxygen content of 0.1 to 4 mg/L.

8. The method for sewage biotreatment according to claim 1, wherein the step (3) and the step (4) are performed in a manner of sedimentation.

9. The method for sewage biotreatment according to claim 1, wherein in the step (1), the second mixed liquor has a sludge concentration of 3,000 to 30,000 mg/L.

10. The method for sewage biotreatment according to claim 1, wherein the method further comprises a step for recovering gaseous phosphorus-containing compounds generated in the step (2) and/or the step (3).

11. The method for sewage biotreatment according to claim 1, wherein the second concentrated mixed liquor that returns from the step (7) to the step (1) and is used as the sludge feed is 1 to 100%, relative to the second concentrated mixed liquor.

12. The method for sewage biotreatment according to claim 1, wherein the second concentrated mixed liquor that returns from the step (7) to the step (1) is of a proportion of 1 to 100%, relative to the sludge feed of the step (1).

13. The method for sewage biotreatment according to claim 1, wherein in the step (6), the sewage biotreatment process is Wuhrmann process, A/O process, Bardenpho process, Phoredox process, $A^2$/O process, reversed $A^2$/O process, UCT process, MUCT process, VIP process, OWASA process, JHB process, TNCU process, Dephanox process, BCFS process, MSBR process, SBR process, AB process, oxidation ditch process, biomembrane process, moving bed process or a combination thereof.

14. An apparatus for sewage biotreatment, comprising:
a first device disposed for mixing a sludge feed with a first mixed liquor to obtain a second mixed liquor; a second device disposed for subjecting the second mixed liquor to an oxygen-supplying process to obtain a third mixed liquor; a third device disposed for subjecting the third mixed liquor to an anoxic process to obtain a fourth mixed liquor; a fourth device disposed for separating the fourth mixed liquor to obtain a supernatant and a first concentrated mixed liquor; a fifth device disposed for discharging the supernatant liquid; a sixth device disposed for returning at least part of the first concentrated mixed liquor as the first mixed liquor to the first device so that the amount of sludge of the first concentrated mixed liquor that does not return to the first device is less than the amount of sludge of the sludge feed; a seventh device disposed for subjecting at least part of the supernatant from the fifth device to a sewage biotreatment process to obtain a second concentrated mixed liquor and a purified water effluent; an eighth device disposed for discharging the purified water effluent; a ninth device disposed for introducing a sewage feed into the first device so as to mix with the sludge feed and the first mixed liquor to obtain the second mixed liquor and/or into the seventh device so as to subject to the sewage biotreatment process together with the supernatant; and optionally a tenth device disposed for returning at least part of the second concentrated mixed liquor to the first device.

15. The apparatus for sewage biotreatment according to claim 14, wherein the second device is disposed to have an oxygen-supplying treatment time of 0.1 to 4 hours.

16. The apparatus for sewage biotreatment according to claim 14, wherein the third device is disposed to have an anoxic treatment time of 0.8 to 6 hours.

17. The apparatus for sewage biotreatment according to claim 14, the second device and third device are disposed so that the ratio of the oxygen-supplying treatment time to the anoxic treatment time is 1:0.5 to 1:6.

18. The apparatus for sewage biotreatment according to claim 14, wherein the second device is an aeration basin.

19. The apparatus for sewage biotreatment according to claim 14, wherein the third device and the fourth device are a sedimentation basin.

20. The apparatus for sewage biotreatment according to claim 14, wherein the apparatus for sludge treatment further comprises a recovery device for collecting and recovering gaseous phosphorus-containing compounds.

21. The apparatus for sewage biotreatment according to claim 14, wherein the seventh device is a device that is disposed to perform sewage biotreatment by Wuhrmann process, A/O process, Bardenpho process, Phoredox process, $A^2$/O process, reversed $A^2$/O process, UCT process, MUCT process, VIP process, OWASA process, JHB process, TNCU process, Dephanox process, BCFS process, MSBR process, SBR process, AB process, oxidation ditch process, biomembrane process, moving bed process or a combination thereof.

* * * * *